H. HOPKINS.
CALCULATING MACHINE.
APPLICATION FILED MAR. 29, 1912.
1,206,113.
Patented Nov. 28, 1916.
19 SHEETS—SHEET 1.
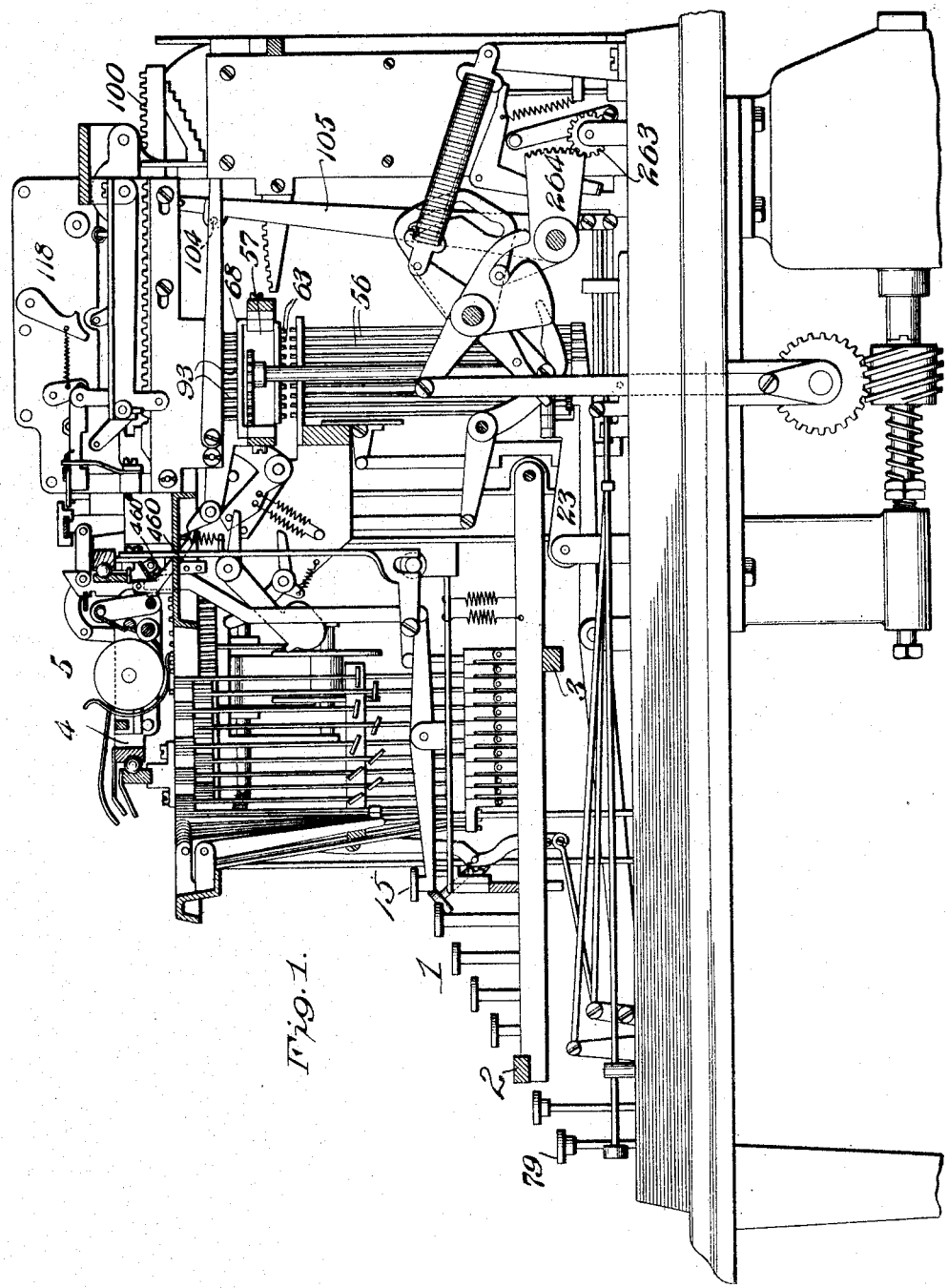
Witnesses:
J. Adolph Bishop
Wm. Jannus
Inventor:
Hubert Hopkins,
by J. K. Carmvalf, Atty.

H. HOPKINS.
CALCULATING MACHINE.
APPLICATION FILED MAR. 29, 1912.
1,206,113.
Patented Nov. 28, 1916.
19 SHEETS—SHEET 2.
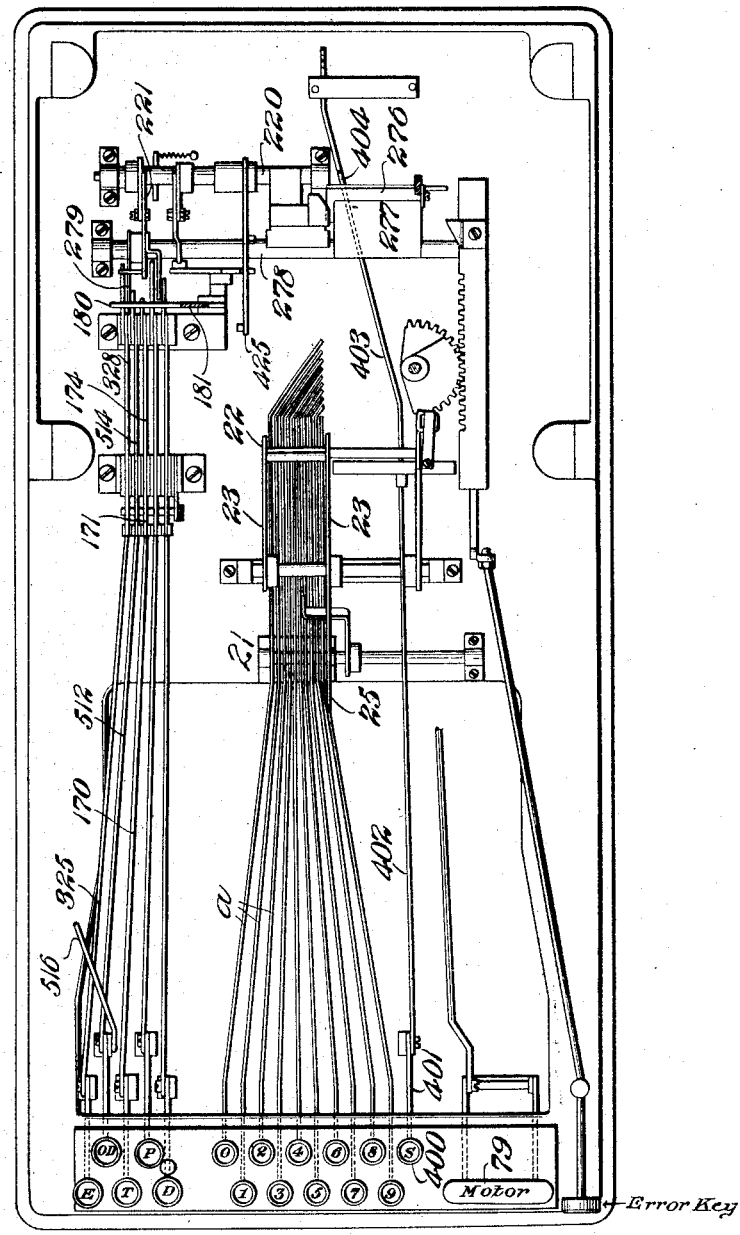
Fig. 1ª
Witnesses:
J. Adolph Bishop
Wm. Janus
Inventor,
Hubert Hopkins,
by J. W. Carmwell
Atty.

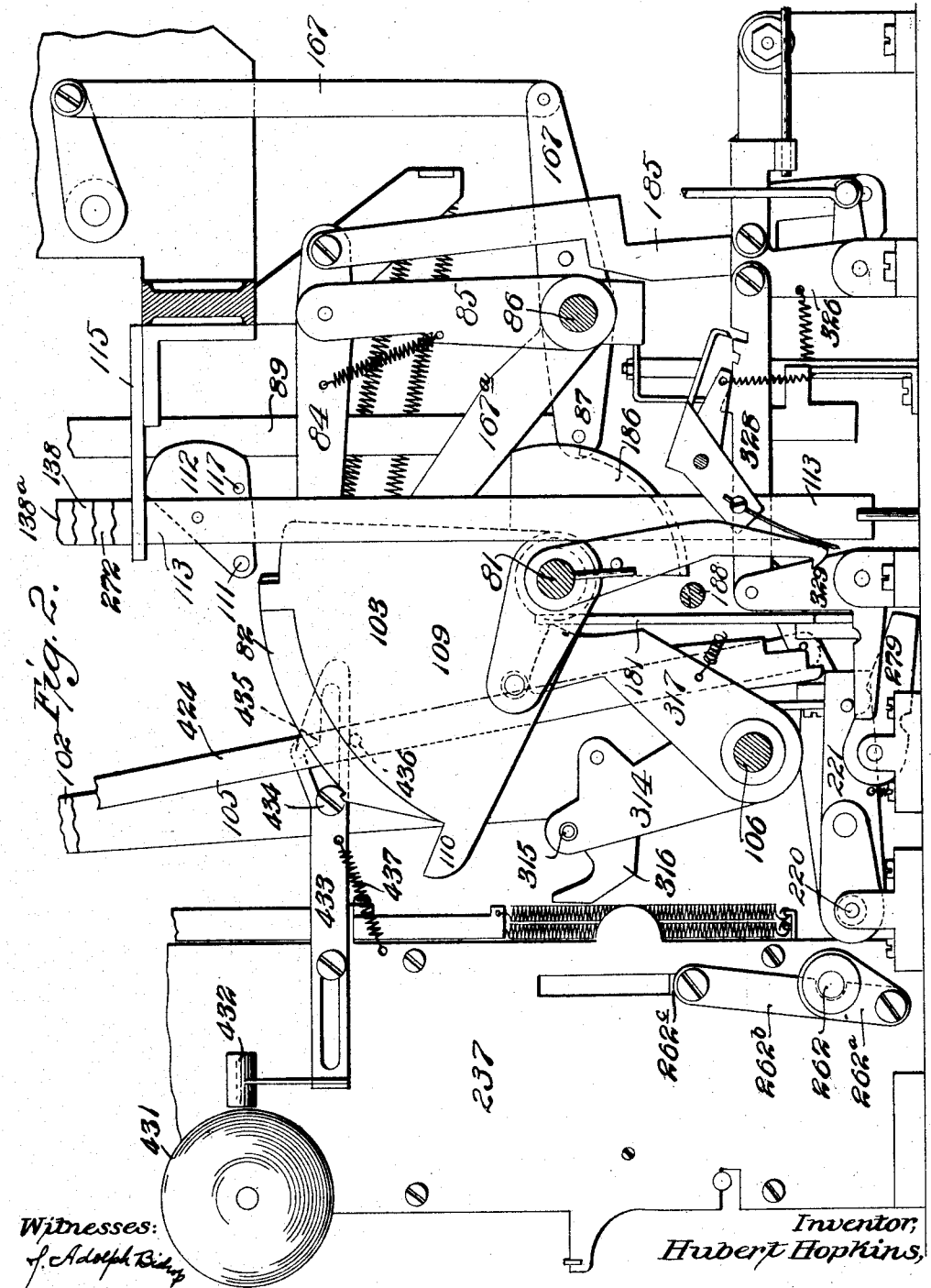

H. HOPKINS.
CALCULATING MACHINE.
APPLICATION FILED MAR. 29, 1912.
1,206,113.
Patented Nov. 28, 1916.
19 SHEETS—SHEET 4.
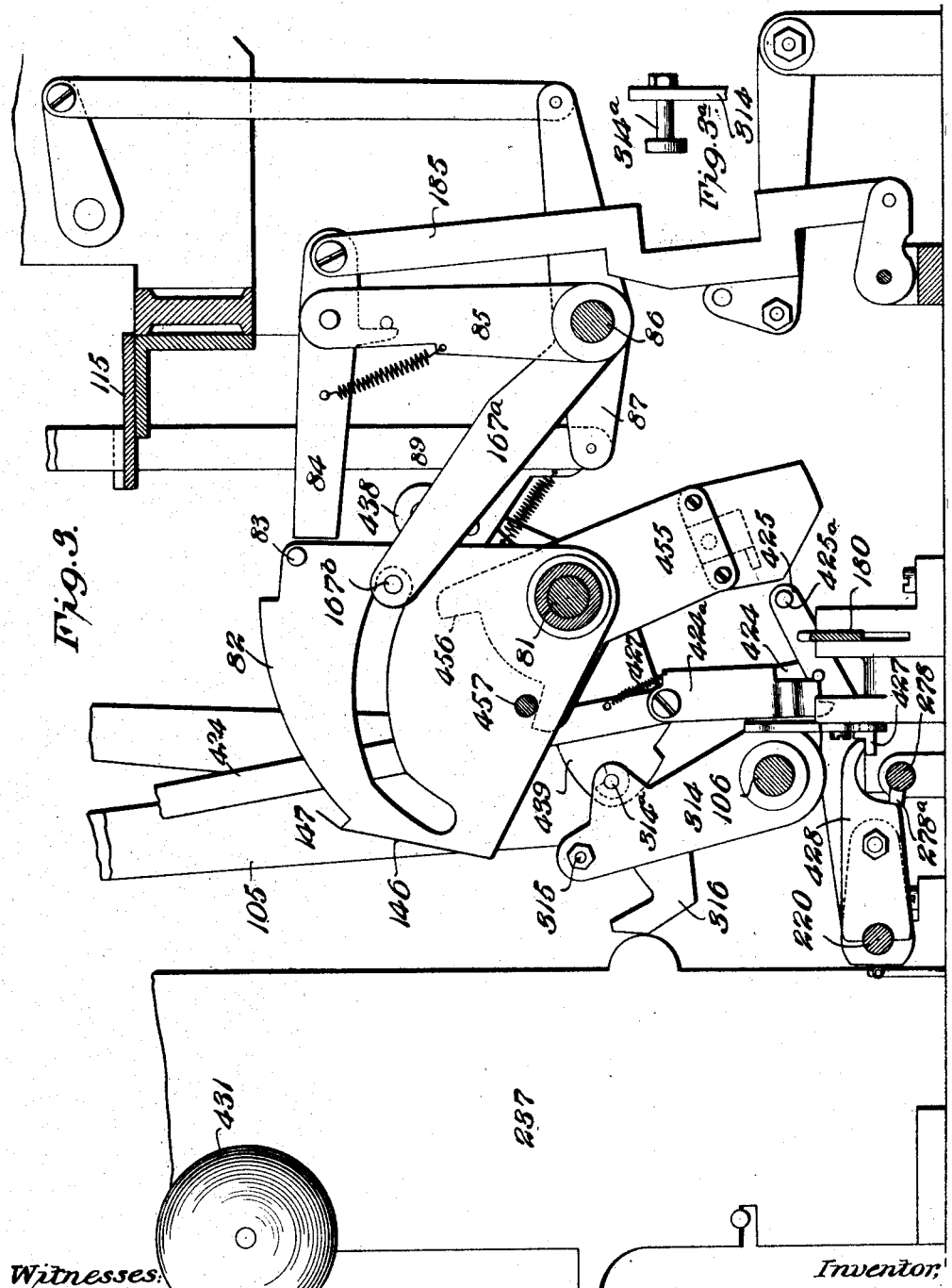

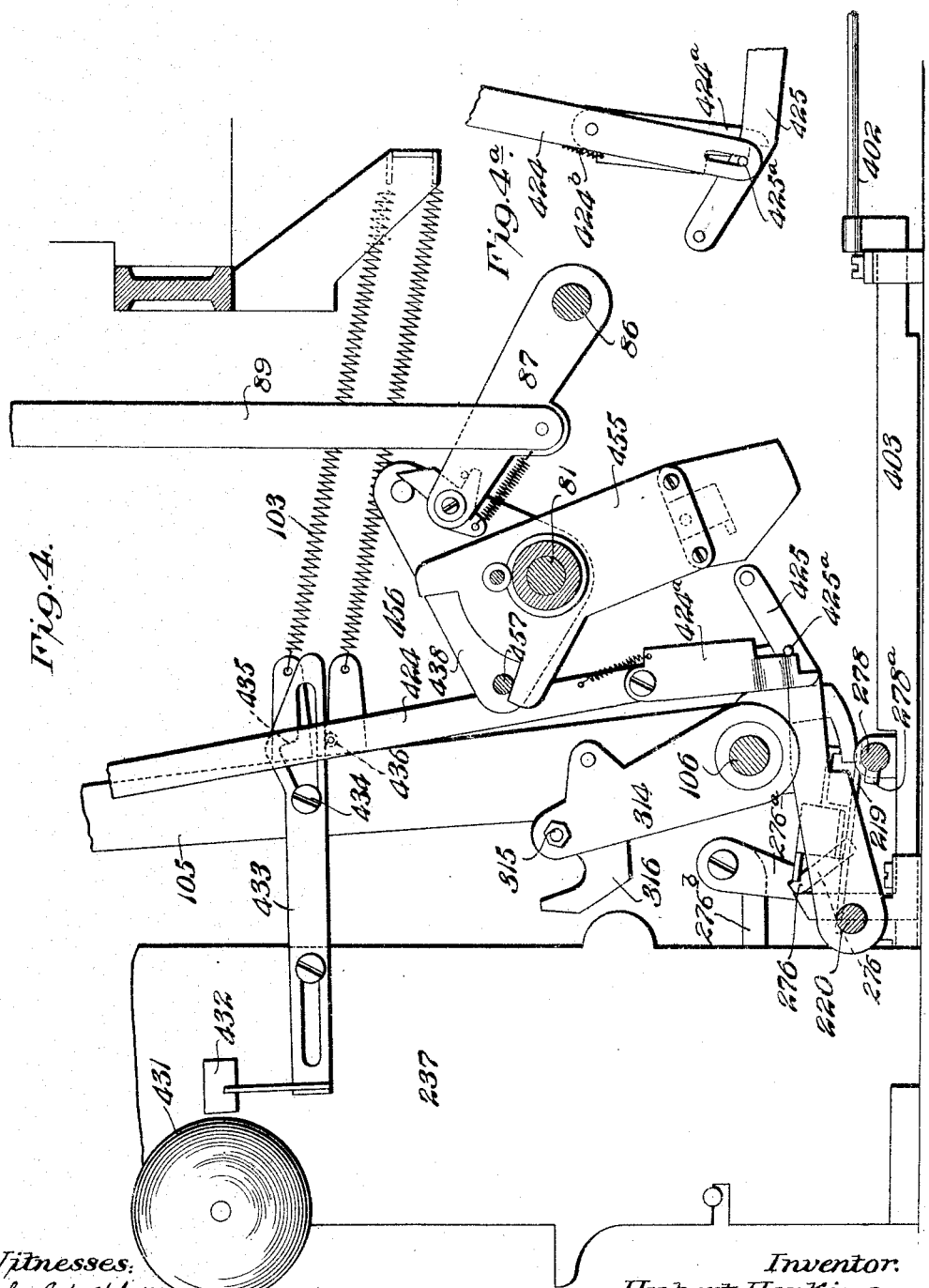

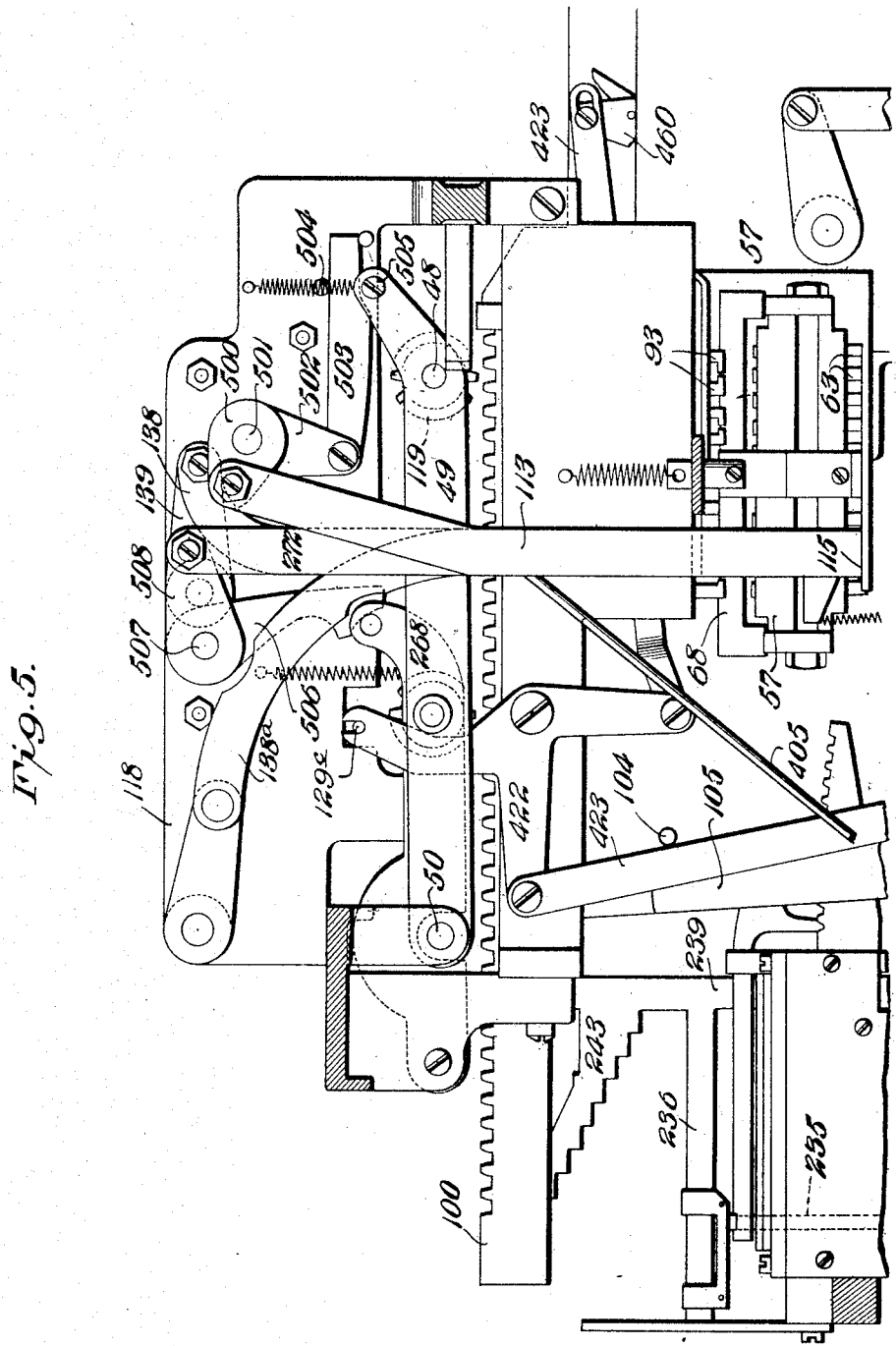

H. HOPKINS.
CALCULATING MACHINE.
APPLICATION FILED MAR. 29, 1912.
1,206,113.
Patented Nov. 28, 1916.
19 SHEETS—SHEET 7.
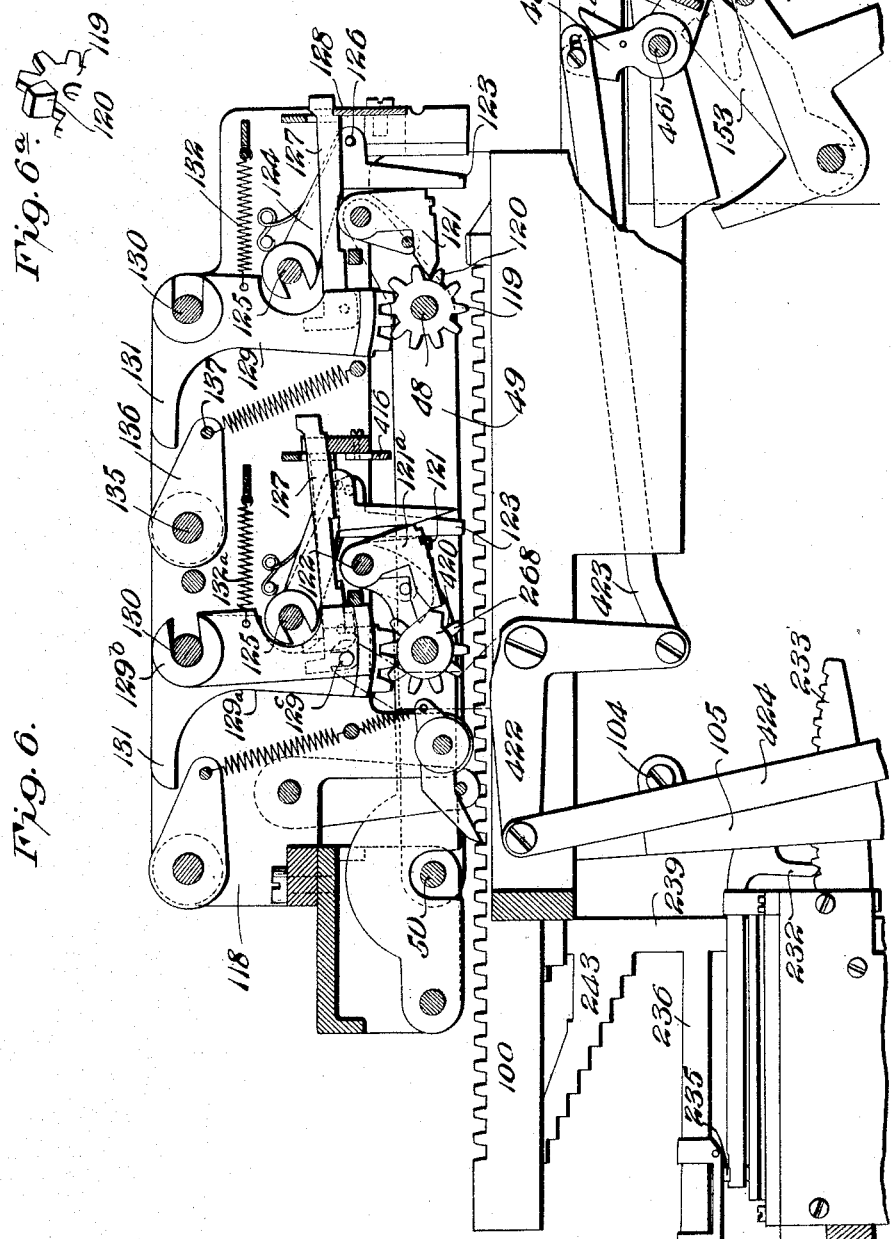
Witnesses:
J. Adolph Bishop
Wm Janus
Inventor,
Hubert Hopkins,
F. H. Cornwall, Atty.

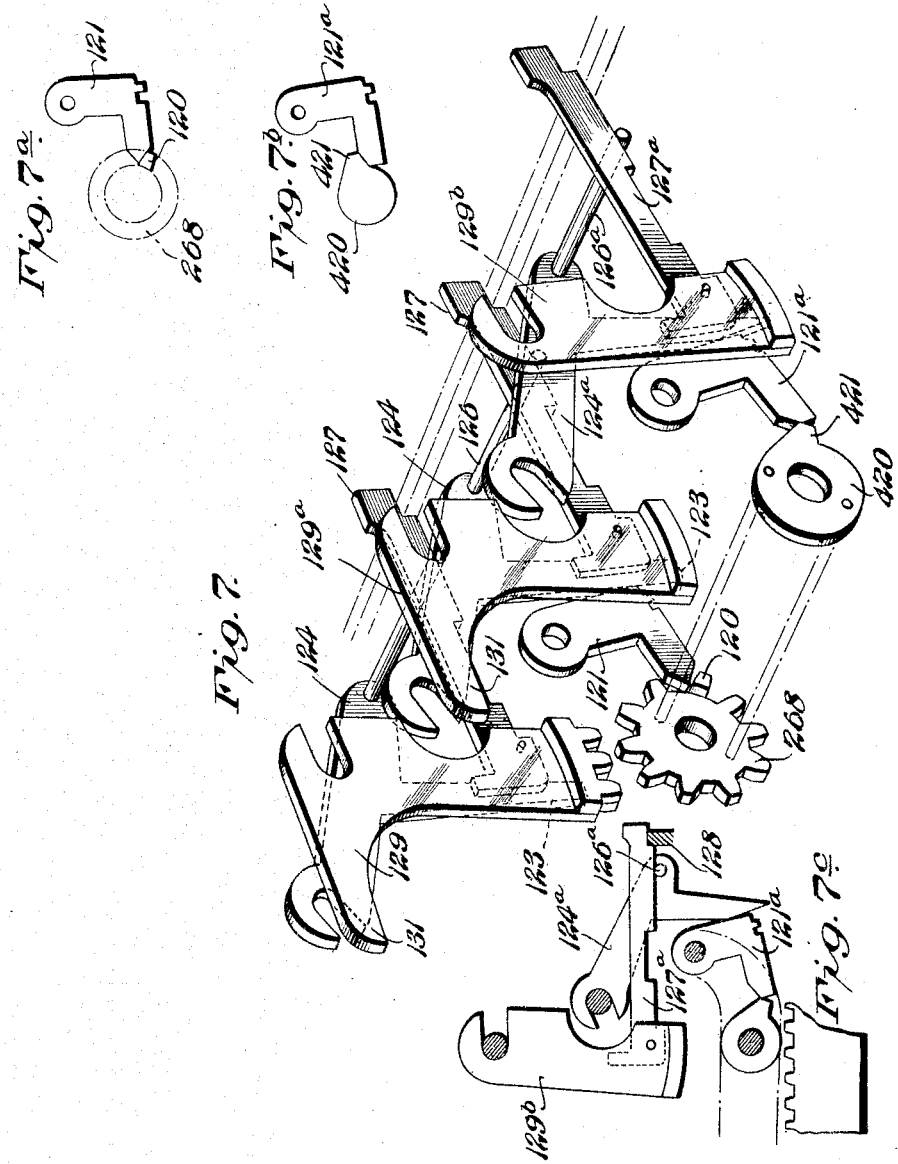

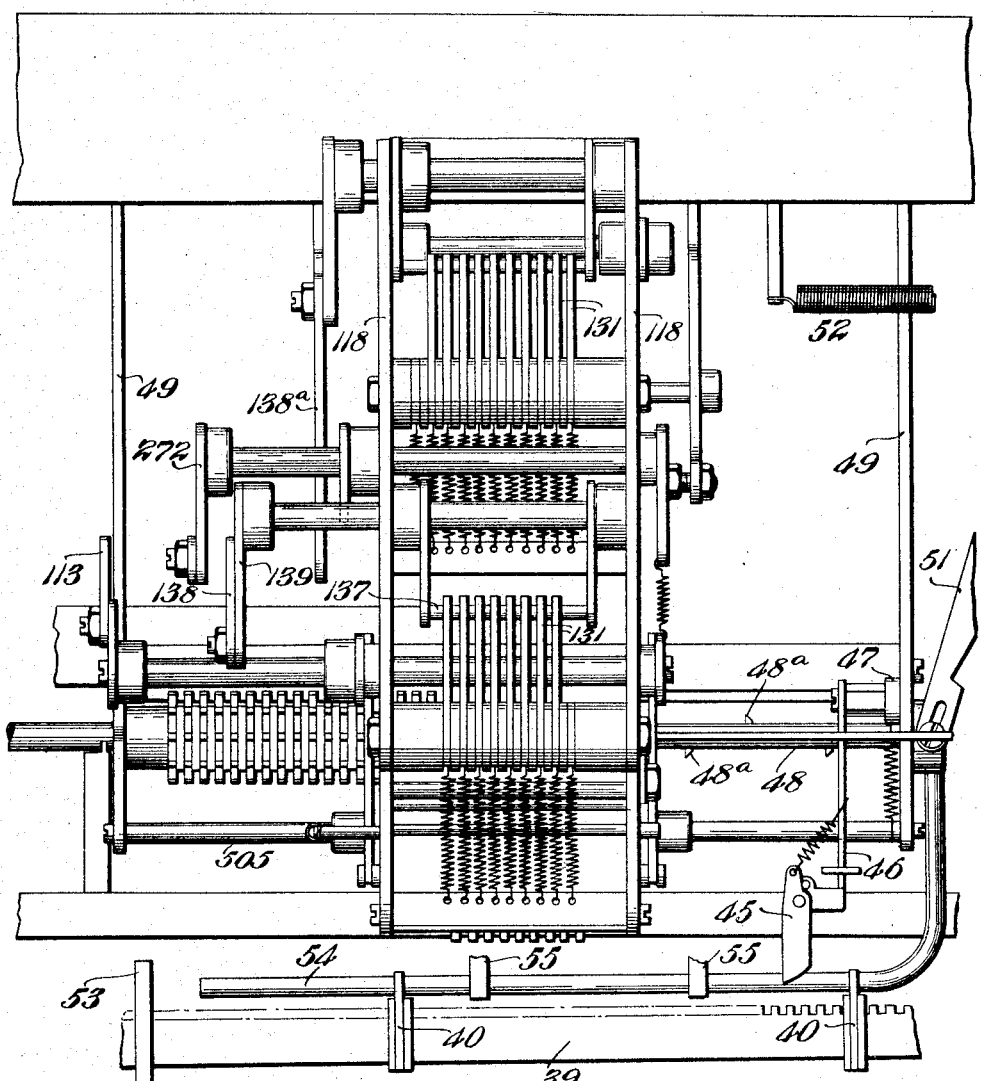

H. HOPKINS.
CALCULATING MACHINE.
APPLICATION FILED MAR. 29, 1912.

1,206,113.

Patented Nov. 28, 1916.
19 SHEETS—SHEET 10.

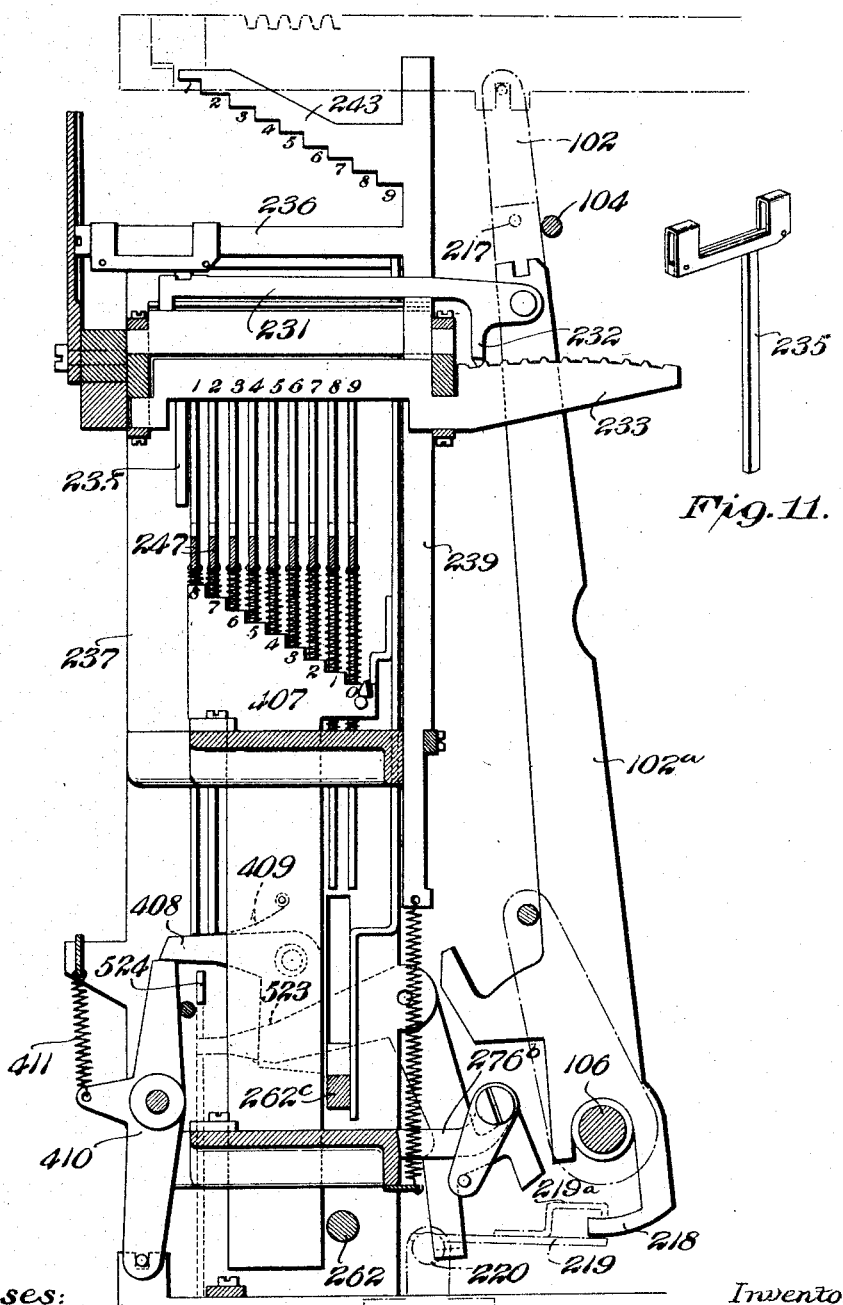

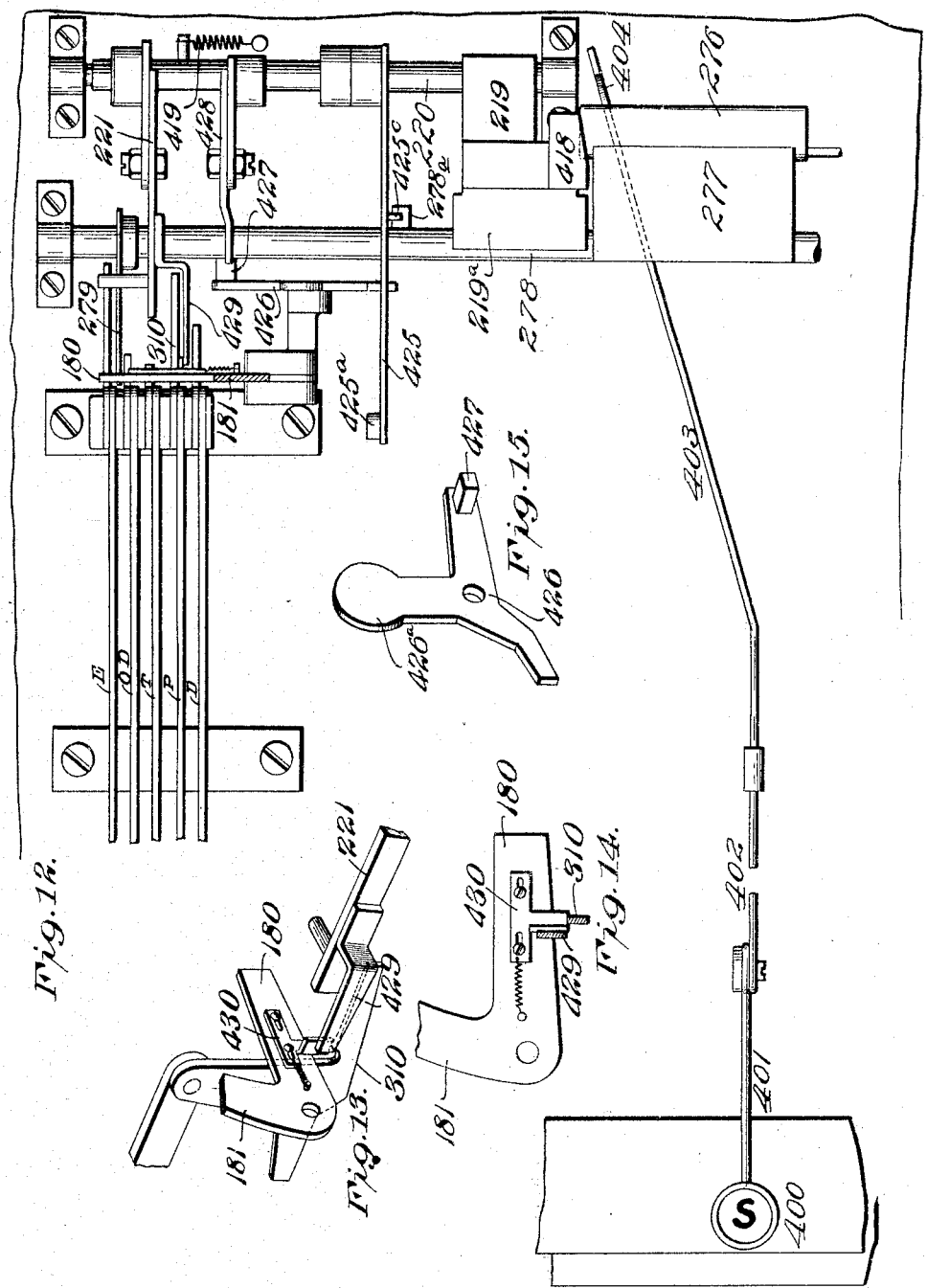

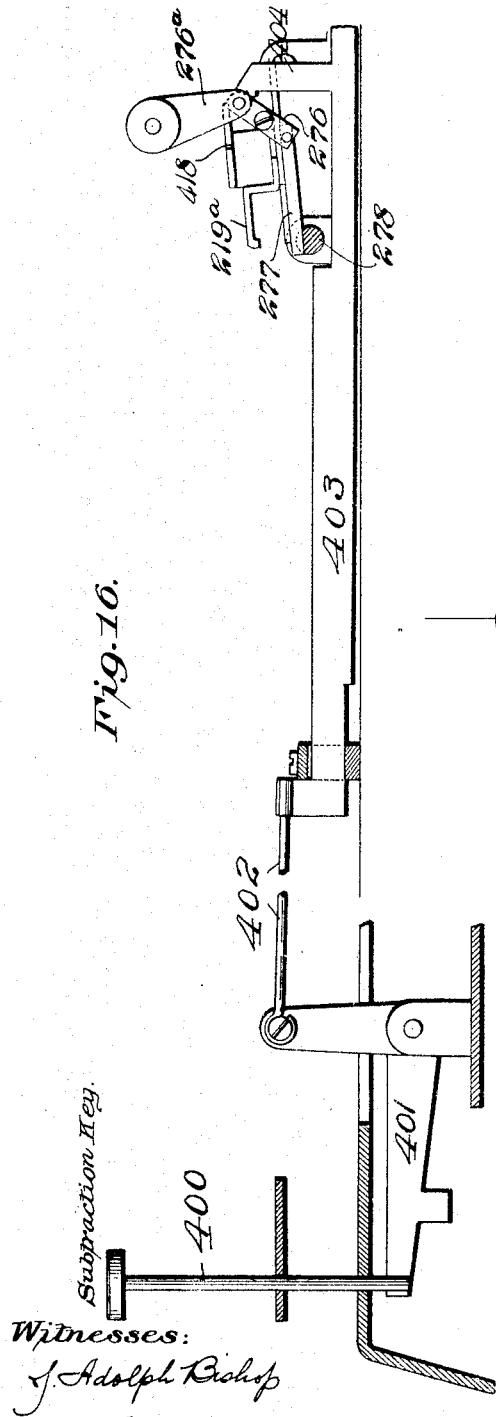
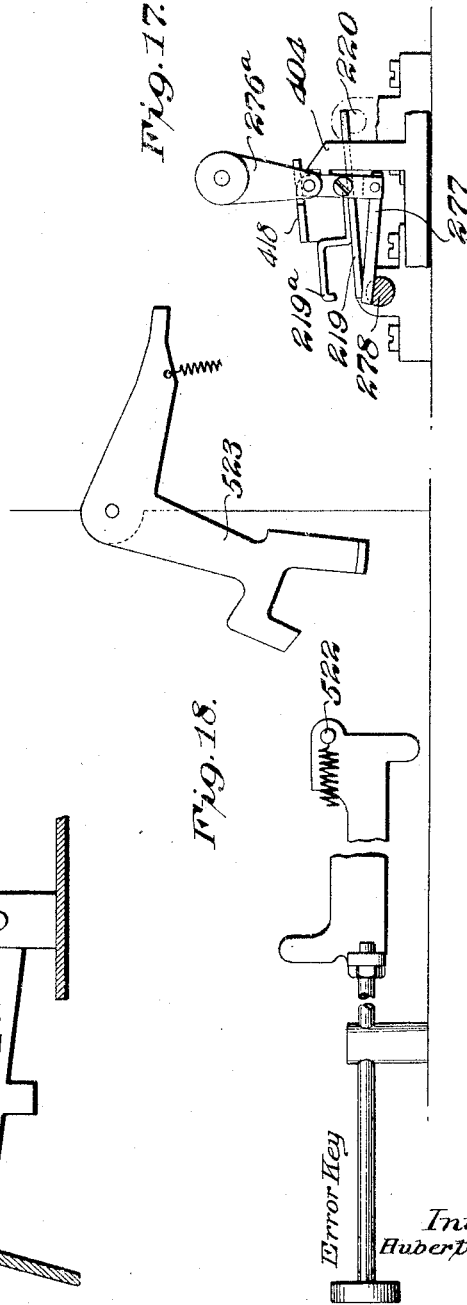

H. HOPKINS.
CALCULATING MACHINE.
APPLICATION FILED MAR. 29, 1912.

1,206,113.

Patented Nov. 28, 1916.
19 SHEETS—SHEET 14.

Witnesses:
J. Adolph Bishop
Wm. Jannus

Inventor,
Hubert Hopkins,
J. W. Cornwall.
Atty.

H. HOPKINS.
CALCULATING MACHINE.
APPLICATION FILED MAR. 29, 1912.
1,206,113.
Patented Nov. 28, 1916.
19 SHEETS—SHEET 16.
Fig. 21.
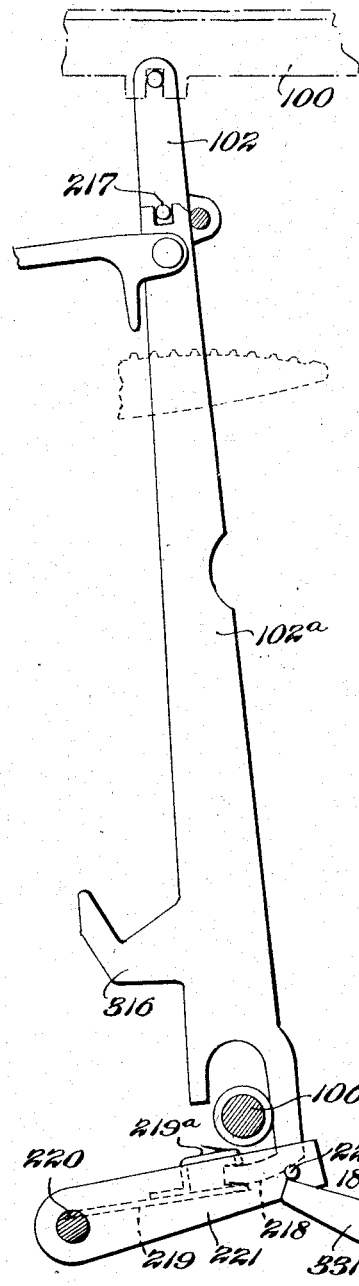
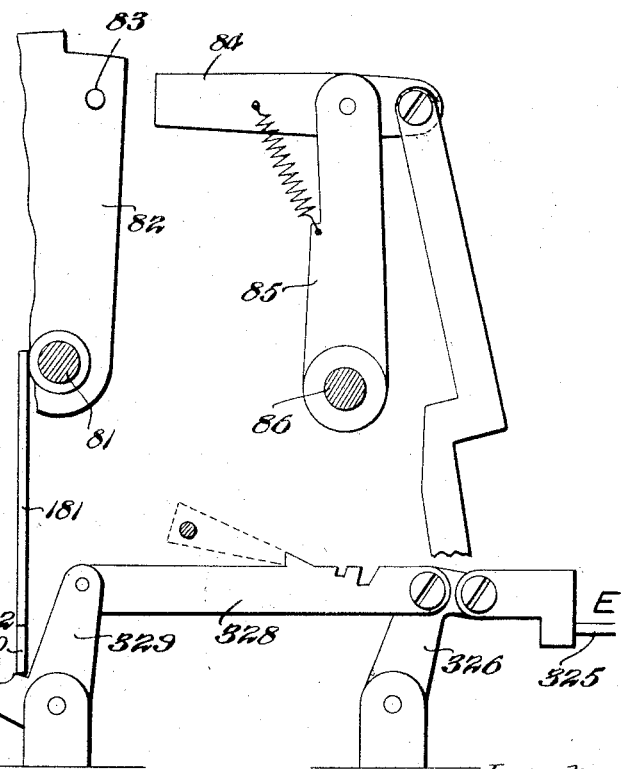
Witnesses:
J. Adolph Bishop
Wm. Jannin
Inventor
Hubert Hopkins,
F. H. Cornwall,
Atty.

H. HOPKINS.
CALCULATING MACHINE.
APPLICATION FILED MAR. 29, 1912.

1,206,113.

Patented Nov. 28, 1916.
19 SHEETS—SHEET 19.

UNITED STATES PATENT OFFICE.

HUBERT HOPKINS, OF ST. LOUIS, MISSOURI, ASSIGNOR TO MOON-HOPKINS BILLING MACHINE COMPANY, OF ST. LOUIS, MISSOURI, A CORPORATION.

CALCULATING-MACHINE.

1,206,113.  Specification of Letters Patent.  Patented Nov. 28, 1916.

Application filed March 29, 1912. Serial No. 687,200.

*To all whom it may concern:*

Be it known that I, HUBERT HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 9:
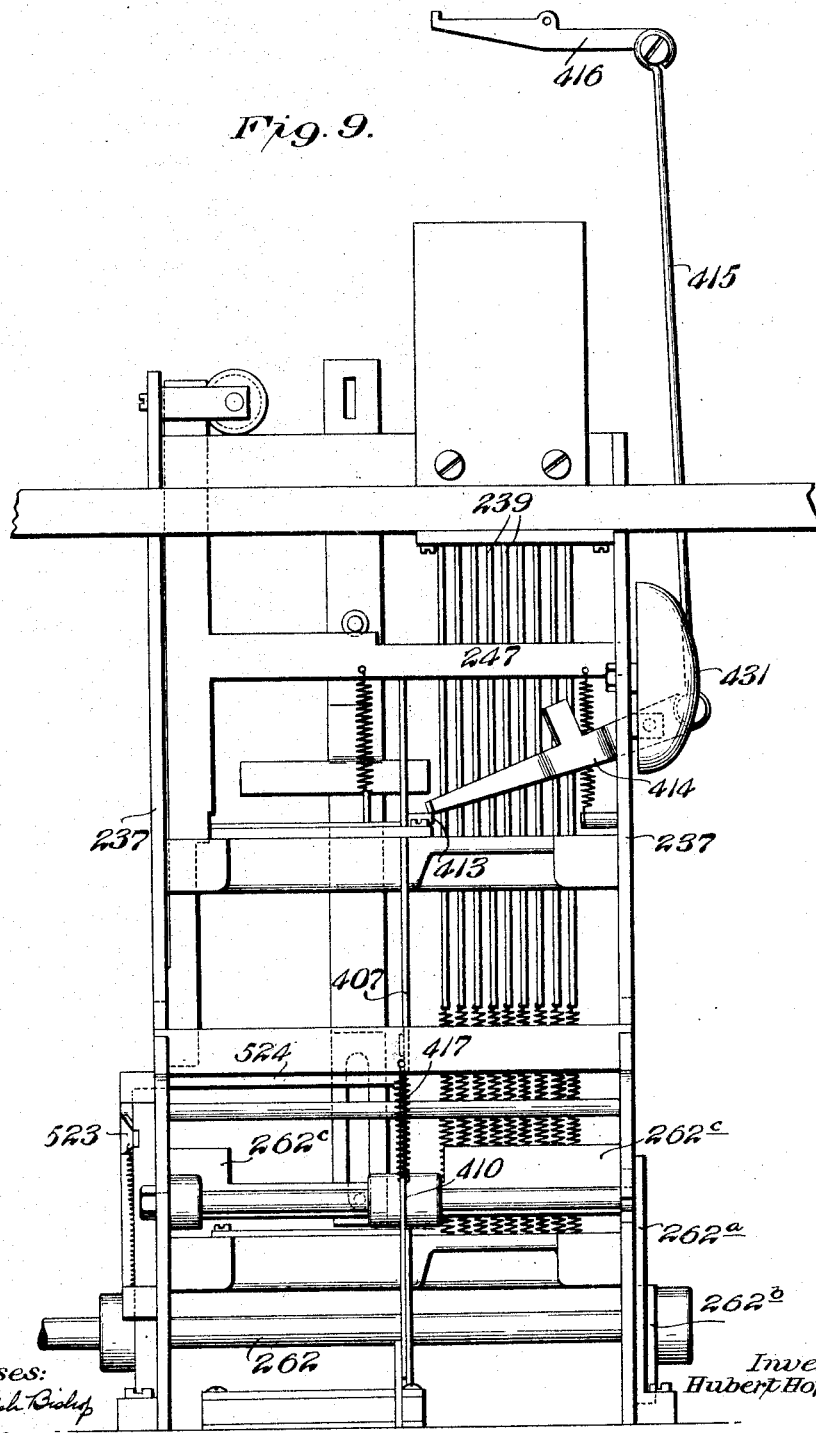
Figure 19:
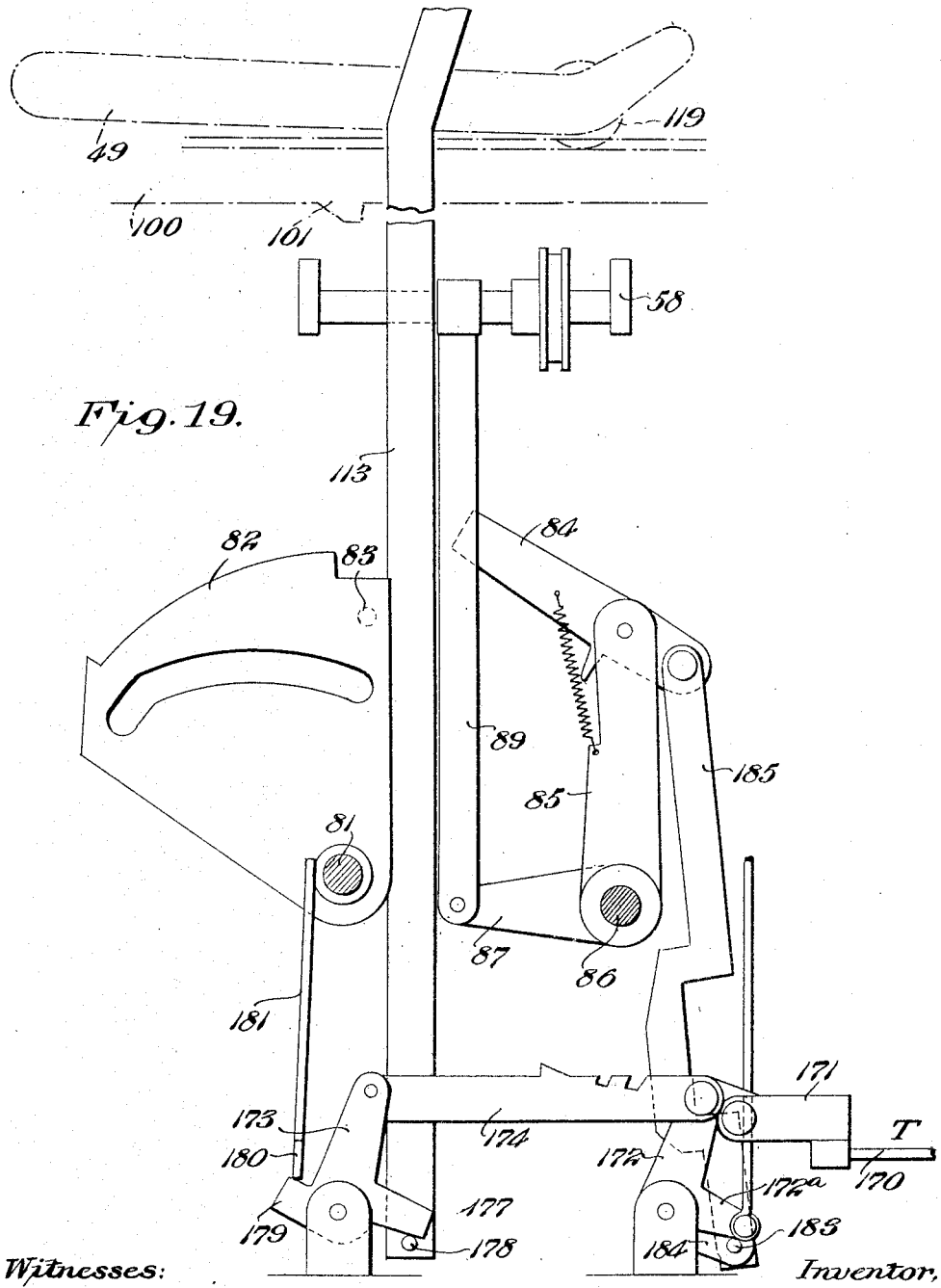
Figure 20:
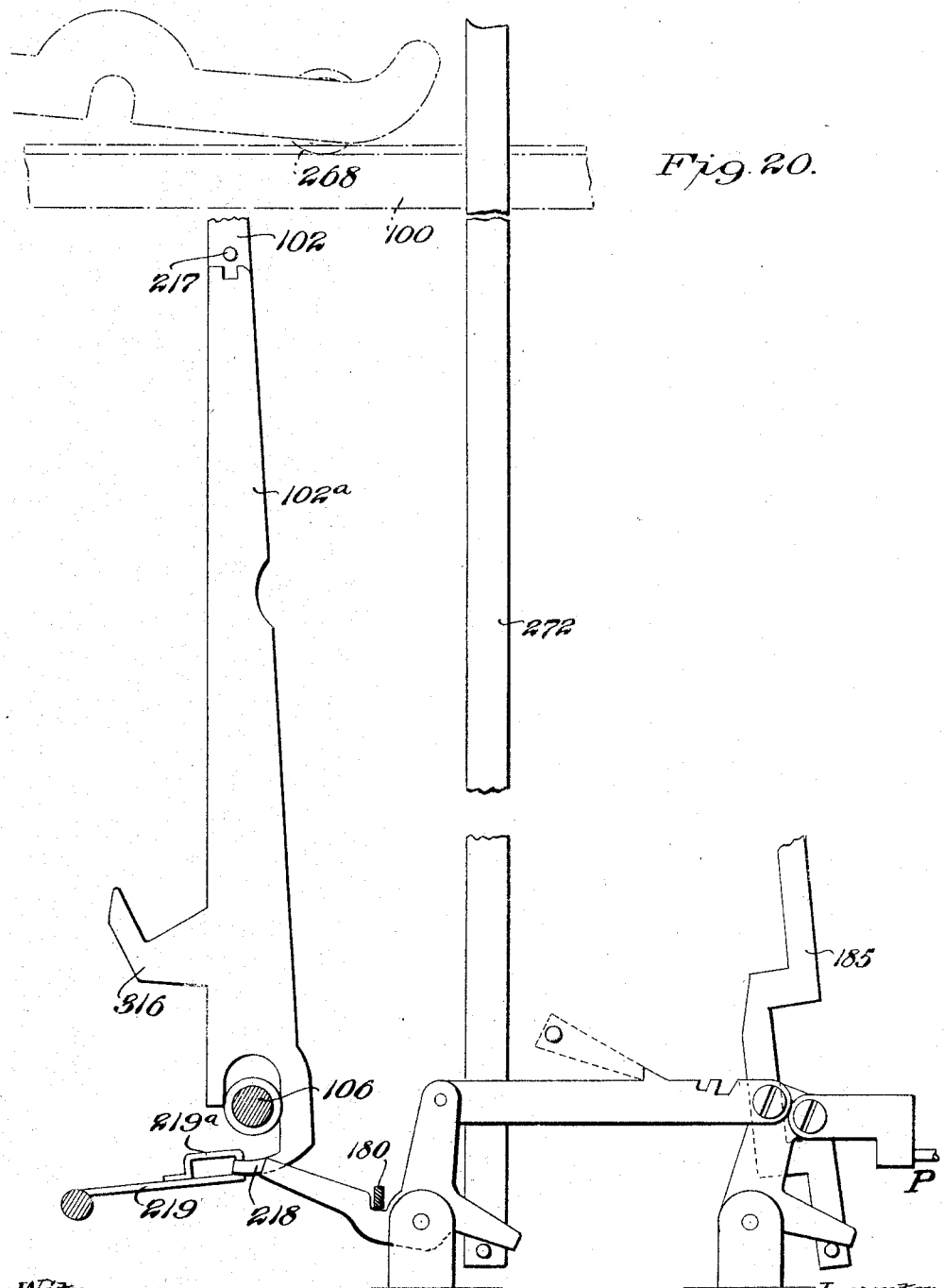
Figure 22:
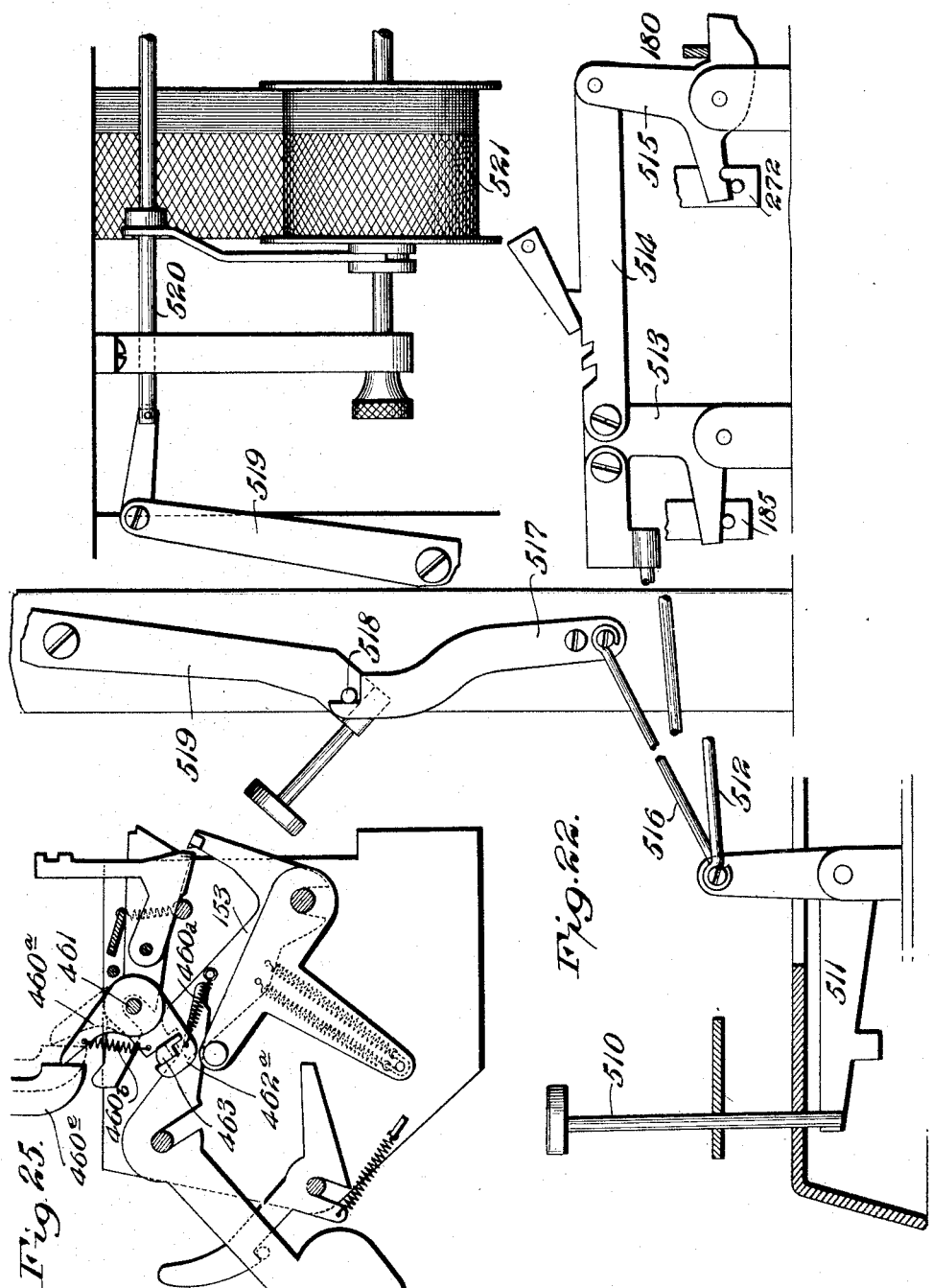
Figure 23:
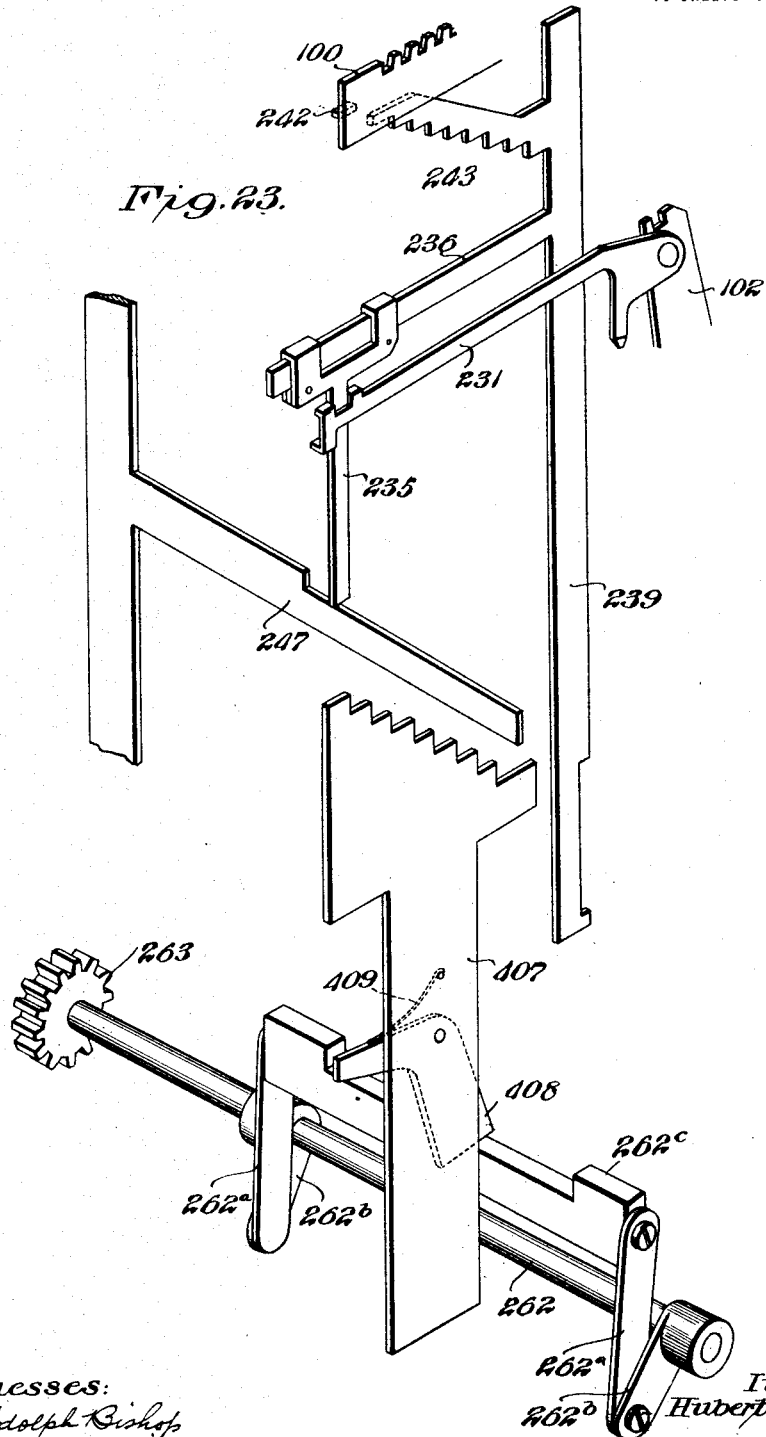
Figure 24:
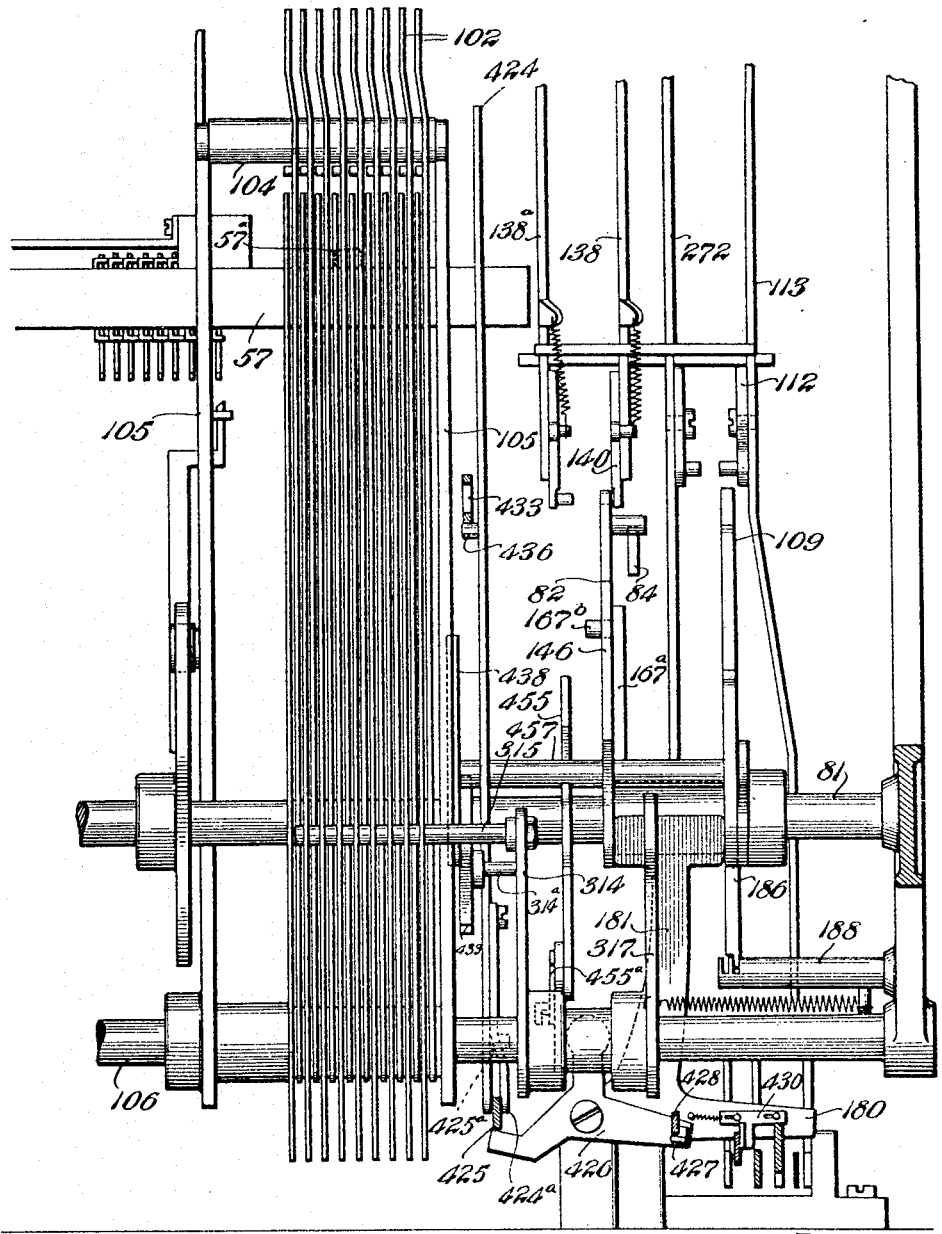

Figure 1 is a vertical longitudinal sectional view through my improved calculating machine, the same being combined with a typewriting machine. Fig. 1ª is a plan view showing the arrangement of the key bars of the calculating machine on the base. Fig. 2 is a side elevational view of the mechanism at the rear of the machine as seen from the left. Fig. 3 is a similar view, certain of the parts shown in Fig. 2 being omitted. Fig. 3ª is a detail fragmentary view looking at the edge of the pendant restoring cam. Fig. 4 is a side elevational view of the rear portion of the machine, certain of the parts shown in Fig. 3 being omitted. Fig. 4ª is a fragmentary detail view illustrating the connection between the lower end of the bar operated by one of the toothless segments, and as seen from the opposite side from that shown in Fig. 4. Fig. 5 is a side elevational view partly in section of the upper rear portion of the machine as seen from the left. Fig. 6 is a similar view, the near frame plate being removed to more clearly show the carrying mechanism. Fig. 6ª is a fragmentary detail view of one of the registering wheels showing a widened tooth which serves as a tripping projection. Fig. 7 is a diagrammatic illustration of the carrying segments identified with the subtraction mechanism. Fig. 7ª is a detail view showing the zero position of a registering wheel relative to this tripping pawl. Fig. 7ᵇ is a similar view showing the "9" position of the one-toothed wheel conjoined to the registering wheel of the highest order and its relation to this tripping pawl. Fig. 7ᶜ is a detail view illustrating the idle operation of the one-toothed wheel relative to the parts controlled thereby. Fig. 8 is a top plan view of the parts shown in Fig. 5. Fig. 9 is a rear elevational view illustrating the subtracting plate and associate parts. Fig. 10 is a vertical longitudinal sectional view showing the subtracting plate and associate parts. Fig. 11 is a detail view of one of the pendants. Fig. 12 is a plan view of the rear ends of the result keys and parts controlled thereby. Fig. 13 is a detail view showing parts operated by the "P" key. Fig. 14 is a rear elevational view of the construction shown in Fig. 13. Fig. 15 is a detail view of the bell crank lever which moves the pendant restoring cam into and out of operative position. Fig. 16 is a side elevational view showing the subtraction key and parts operated thereby. Fig. 17 is a detail view showing certain of the parts, at the left in Fig. 16, in a different position. Fig. 18 is a side elevational view of the error key and connections illustrating its control of the subtraction plate. Fig. 19 is a diagrammatic view illustrating the "T" or "total" key and parts operated thereby when said key is depressed. Fig. 20 is a similar view showing the parts operated by the "P" or "product" key when depressed. Fig. 21 is a similar view showing the parts operated when the "E" or "extension" key is depressed. Fig. 22 is a similar view showing the parts operated when the "O. D." or "over-draft" key is depressed. Fig. 23 is a detail view illustrating the subtraction plate and its connections. Fig. 24 is a rear elevational view showing the sliding cams and associate parts. Fig. 25 is a detail view of the printing mechanism.

This invention relates to a new and useful improvement in calculating machines, and particularly to means whereby subtraction may be performed.

In computations, it sometimes happens that in introducing long lists of numbers into the minuend and subtrahend registers, such for instance as in taking bank balances, where amounts deposited are registered in the minuend register, and the amounts of the various checks are registered in the subtrahend register, the total in the subtrahend register exceeds the number in the minuend register, and in the ordinary operation of the machine, it would be impossible to subtract the larger number from the smaller.

The ordinary method of subtracting the smaller number (subtrahend) from the larger (minuend) employed in calculating machines, is to add the complement of the subtrahend to the minuend, the result plus one (1) added to the units column being the true remainder. For instance, if 547 was the total in the subtrahend register and 843 the total in the minuend register, the difference of 296 would be obtained in my machine as follows: Assuming that the register wheels 268 constitute the minuend register and that the total 843 registered therein is made up of a series of smaller items, and that the wheels 119 constitute for the moment, the subtrahend register, and that the number 547 introduced thereinto is made up of a series of items separately introduced into said register, the number in the subtrahend register is transferred back to the pendants 235, which pendants are positioned so as to represent the number constituting the subtrahend to wit: 547; or the subtrahend may be set up on the key board of the machine and by pressing the "extension key" be introduced directly into the field of pendants. When the "subtraction" key is depressed and the machine operated to obtain the remainder or difference between the subtrahend and the minuend, the racks 100 move forwardly, so as to add the complement of the subtrahend to the minuend previously registered in the wheels 268 (one (1) being automatically added in the units wheel) on their return or backward stroke. This operation is graphically illustrated by the following:

000000843 (Minuend)
000000547 (Subtrahend)
000000843 (Minuend)
999999453 (Complement of subtrahend plus 1)
---
000000296 (Correct remainder)

From the above examples it will be seen that the complement of the subtrahend contains a series of 9's in all denominations higher than the highest denomination in the subtrahend. Particular attention is called to this fact here because it forms an important element in computations where the number registered in the subtrahend register is greater than the number registered in the minuend register such for instance, as will occur where a bank account is overdrawn, and it is desired to indicate such overdraft. It is also important to observe the following two rules which obtain in every instance:

(1) Where the number registered in the subtrahend register is smaller than the number registered in the minuend register and the complement of the number registered in the subtrahend register is added to the number registered in the minuend register (and which complement by virtue of the fact that one is automatically added in the units column thereof may be termed an "excessive" complement) a series of 9's will always be added into the minuend register in all orders higher than the highest denomination in the (complement of the) subtrahend, and these 9's will be automatically "carried" out of the machine, so as to turn such wheels in the minuend register of such higher denominations back to zero. The zeros in such higher denominations are not printed and hence the true remainder appears.

(2) Where the number registered in the subtrahend register is larger than the number registered in the minuend register and the complement (the "excessive" complement above referred to) is added in the minuend register, there will be no carrying from the addition of the two numbers in the highest denomination of the complement of the number registered in the subtrahend register and the number registered in the minuend register, because these two numbers can never exceed 9, and hence the 9's in the higher denominations will not be "carried" out of the minuend register, but will remain therein. To illustrate the second rule:

If it is attempted to subtract 843, the number registered in the subtrahend register, from 547, the number registered in the minuend register, the two registers would stand as follows:

000000547 (Minuend)
000000843 (Subtrahend)

By adding the complement of the number registered in the subtrahend register, plus 1, to the minuend register we obtain the following:

000000547 (Minuend)
999999157 (Complement of the subtrahend plus 1)
---
999999704

It will be noted that in the effort to subtract the larger number from the smaller, the numbers in the 100's column of the minuend register and the complement of the number registered in the subtrahend register when added together do not exceed 9, and hence no carrying can take place from the 100's wheel to the 1000's wheel and consequently the 9's from the 1000's wheel and upward are not eliminated but appear in the minuend register ready to be printed if an effort is made to record such an incorrect total.

Where this condition exists in my machine, I provide means whereby the incorrect remainder will be converted into a correct remainder, so as to obtain the true difference between the two numbers, notwithstanding the fact that the smaller number may have originally been introduced into the minuend register.

In order to indicate to the operator that the number registered in the minuend register is smaller than the number registered in the subtrahend register, means are provided whereby a bell is sounded, (or a visual indicator may be operated,) whereupon the operator is informed that the correct difference between the two numbers can be obtained without further manipulation of the keyboard.

Due to the fact that a series of 9's are left in the higher denominations, mechanism is provided whereby this condition of the minuend register is taken advantage of to retain certain mechanism in such position, whereby the sum of the number registered in the minuend register and the complement of the number registered in the subtrahend register may be set up in the field of pendants and the minuend register cleared. This is done when the "product" key is depressed and the machine operated to obtain the incorrect remainder. The subtraction key is again depressed and the machine operated, so as to obtain the complement (or "excessive" complement) of the sum of the former numbers in the minuend register and the complement of the number formerly in the subtrahend register, which complement of such sum will be the true difference between the two numbers, for instance:

999999704  (Number set up in pendants)
000000296  (Complement of above number)

The complement 296 is set up in the minuend register, and it is the true difference between 843 and 547.

From the above brief description, it will be seen that an operator in listing various credit and debit items, will, if unaware of the totals of said items, be informed of the fact that the debits (introduced into the subtrahend register) are in excess of the sum of the credits (introduced into the minuend register) when he attempts to subtract the larger number from the smaller. The operator will then be in a position to again operate the machine without setting up any numbers on the key-board and obtain a correct difference between the two numbers.

Means are also provided whereby the true difference between two numbers where the number in the subtrahend register is larger than the number in the minuend register may be printed in a distinctive color and not added to the sum of the true remainders introduced into a totalizer and accumulated as such, and which true remainders are the result of subtracting the subtrahend, the smaller number from the minuend, a larger number.

Other features of my invention will be set forth in the following description, and afterward pointed out in the claims.

Many of the parts of my present machine are disclosed in Belgium Patent No. 202,081, dated August 21st, 1907, and also an application serially numbered 310,739 filed by me in the United States Patent Office on or about April 9th, 1906, and I therefore do not claim in this application, the structure disclosed in said patent and application, except as the same enter into combination with my present invention.

While the present improvements are designed to be applied to the machine shown in said patent and application, it will be understood that, by obvious alterations and changes, these improvements could be applied to other types of calculating machines, and I do not wish to be understood therefore, as limiting my invention to the type of machine herein shown.

It is desirable in the use of my present invention to combine the same with a calculating machine which is used in conjunction with a typewriter, such as disclosed in the Belgium patent aforesaid, and to which reference is made for a better understanding of the relations between the printing mechanism of the calculating machine and said typewriting mechanism.

*The typewriting mechanism.*—In the accompanying drawings, referring to Fig. 1, there is shown a typewriting mechanism of which 1 indicates the keys and key bars. 2 is the spacing key of the typewriting mechanism, and 3 is a spacing bar controlling the escapement mechanism of the typewriter carriage.

4 is the frame of the typewriter carriage, in which is mounted a platen 5. Means are provided for manual rotation of this platen, as in line-spacing and also mechanical rotation in line-spacing, where a record is being made by the printing devices of the adding mechanism of the machine. An escapement bar is provided whereby the carriage may move step-by-step laterally in letter or figure spacing, and tabulating keys 15 are provided whereby the carriage may be arrested to predetermined lateral positions for work of tabulation. The typewriting mechanism of my present machine may, in addition to the essential features of such a mechanism, heretofore described, also be provided with such additional features as may be desired or useful. I deem it unnecessary to give a more detailed description of the typewriting mechanism here, as a reference to the before-mentioned patent will give a full and clear explanation of the same.

*The adding mechanism.*—The keys in group A (see Fig. 1ª) which are identified with the adding mechanism, are connected to a series of bars *a* which are mounted upon a common pivot 21, said bars to the rear of said pivot having their ends deflected so as to lie in a straight line under a longitudinal row of independent vertically movable bars 56 which coöperate with the setting up pins 63 of the carriage 57. The rear ends of these bars *a* extend under a plate 22 pivotally mounted in the free end of a yoke frame 23 which has a forward extension 25 arranged above the spacing bar 3 of the typewriter. In this manner the operation of any of the keys in group A will depress the bar 3 and actuate the escapement mechanism of the typewriter carriage, causing the carriage to move laterally step-by-step a number of spaces equal to the number of figures set up on the keys of group A. The operation of the carriage escapement from the keys in group A is particularly useful in lineal addition as it is only necessary to strike the space key once after the printing of each number.

Means are provided for locking the carriage against lateral movement in order that vertical columns of figures may be printed, but it is unnecessary to describe these means here in detail.

Means are also provided for rotating the carriage in the operation of printing numbers one under the other in column formation, but it is unnecessary to describe such mechanism here as the same is fully set forth in the before mentioned patent.

*Controlling the position of the forward totalizers from the typewriter carriage.*—Referring to Fig. 8, 39 indicates a bar which is carried by the typewriter carriage and whose rear edge is provided with a series of notches in which may be adjustably mounted a series of blocks 40. There are preferably two of these adjustable blocks 40 which are designed to coöperate with a tappet 45 mounted on a sliding bar 46. This bar is connected at its rear end to an escapement lever 47, which escapement lever, when vibrated, permits the forward totalizers to move from right to left as fully set forth in the patent aforesaid.

48 is a shaft on which the forward totalizers are mounted, said shaft finding bearings in two frame plates 49 pivoted at their rear ends to the shaft 50. Shaft 48 is provided with escapement teeth 48$^a$.

51 indicates a lever pivoted to the end of shaft 50, its free end being pivotally connected to the end shaft 48 by a slot and pin connection. A spring 52 tends to draw the lever 51 toward the left, and consequently whenever lever 47 is vibrated the escapement mechanism will operate to permit the shaft 48 and its carried totalizer wheels to move under the action of spring 52. Thus if the typewriter carriage is moving toward the left, and one of the blocks 40 should strike the inclined face of tappet 45, the bar 46 would be forced rearwardly, operating the escapement mechanism, displacing the totalizer which was in operative position with respect to the rack bars, and arranging in operative position the next or middle group of totalizers at the right. If now the next block 40, in the continued step-by-step movement of the typewriter carriage to the left, strikes the inclined face of tappet 45, the escapement mechanism would again be operated so as to displace the operative group of totalizer wheels and bring into operative position the next operative group of totalizer wheels at the right. By adjusting the blocks 40 the escapement mechanism may be operated at different positions of the typewriter carriage.

As it is necessary to restore the groups of totalizer wheels to their initial position when the typewriter carriage is restored, means are provided for accomplishing this, which means consist of a block 53 similar, so far as its adjustable feature is concerned, to the blocks 40. Block 53, however, is provided with a downward extension, which coöperates with the end of a rod 54 mounted in suitable guides 55 extending from the frame plate of the typewriting machine. Rod 54 is connected to shaft 48, and consequently when the typewriter carriage is moved from left to right the downward extension on block 53 engages the rod 54 and restores the totalizers to their first position at the right. If it is desired not to position the forward groups of totalizers upon the movement of the typewriter carriage, blocks 40 may be moved to extreme right or left of bar 39.

*Introducing an item into the forward totalizers.*—When any of the keys in group A is struck, one of the bars 56 before referred to is raised, and in turn this bar raises one of a series of setting up pins 63 arranged in the traveling carriage 57. There is an escapement mechanism operated by the rear end of yoke 23, which escapement mechanism controls the travel of the carriage from right to left, which travel is caused by a spring, not shown, which is connected to said carriage. At each depression of a key the carriage travels one step leftward from a lower to a higher order, various pins being positioned by the several bars 56 according to the key struck. In setting up an item it is only necessary to strike the keys in succession, beginning with the highest denomination.

After an item has been set up on the keys, the operating handle is operated, or the motor key 79 depressed, which causes the traveling carriage to be bodily lifted, the elevated pin 63 positioning corresponding stop pins 93 in their paths. After the pins 93 have been positioned the carriage is depressed and restored to home position, movement to home bringing all of the elevated pins 63 into engagement with a cam bar not shown, which restores the elevated pins 63 to their normal position. At the time that the traveling carriage is being restored, the operating handle rocks two main levers 105 forward, which levers carry a restoring bar 104. This restoring bar, as shown in Figs. 1, 5 and 6, lies in front of rocking levers 102 which have slot and pin connections with the rack bars or actuators 100. Springs 103 are connected to levers 102 and tend to move them forward at all times. Shoulders 101 are provided on the rack bars 100, which shoulders come in contact with any of the pins 93 which may have been raised, thus arresting the movement of the rack bars, but permitting the restoring bar to move forward its full stroke under the control of the operating handle.

To prevent forward movement of the idle rack bars, the zero row of pins 93 (being the rearmost row of pins) are elevated by means of a plate on the traveling carriage, not shown, which plate raises all of the zero stop pins to the left of the highest series containing an actuated pin, whereby all of the rack bars of higher denomination are prevented from movement, and only those which are to be active are permitted to move forward to positions determined by the elevated stop pins of a higher order than zero.

A comb plate not shown is operated when the handle completes its return movement to restore the pins 93. On the return movement of the handle the restoring bar 104 picks up all of the levers 102 and moves them and their complementary rack bars rearwardly. When the handle completes its forward movement cam plate 109 coöperates with a tappet 112 mounted on a bar 113 and coöperating with a plate 115 (see Fig. 2), said bar being connected to a swinging frame plate 49 in which the forward totalizers are mounted. In this manner the forward totalizers are brought into engagement with the racks when the racks are moving rearwardly, and the item set up on the keys in group A is thus introduced into the group of forward totalizers in operative relation to the actuating racks.

*Carrying devices.*—The carrying devices are slightly different from those disclosed in the Belgium patent aforesaid and I shall therefore describe such differences.

118 are side frame plates arranged on the frame of the adding machine and which form bearings for the several shafts on which are mounted the moving parts of the carrying mechanism. The carrying mechanism, about to be described, is common to the three groups of forward totalizer wheels with the exception of the high carrying segments of the rear totalizer.

Each totalizer wheel 119 and 268 has a tripping projection or wide tooth 120 at its left (see Fig. 6ª) which coöperates with a pendant 121 to swing said pendant forwardly when the register wheels are being operated by the racks in the rearward movement of the racks, said pendent pawls 121 also acting as zero stops against which the tripping projections 120 are arrested in the reverse rotation of the register wheels, as in total taking operations. These pendent pawls 121 engage pendent projections 123 of a tripping lever 124 pivoted at 125, said lever 124 carrying the pin or projection 126 lying under the forward end of a shouldered bar 127 whose forward end is mounted in the slot in the upper edge of a comb plate 128 and whose rear end is pivotally connected to a swinging segment 129 pivotally mounted on a bar 130.

The segments 129 which are employed for carrying purposes in additive operations have teeth at their lower edges and are provided with rearwardly extending fingers 131; but, for subtracting purposes one segment of higher denomination than the carrying segments before referred to, as shown in Fig. 7, is toothless, although it has a rearwardly extending finger 131. This toothless segment I have indicated at 129ª. The segment of still higher denomination, indicated at 129ᵇ, is not only toothless, but does not have the rearwardly extending portion 131, common to the other segments. Springs 132 are connected to the segments 129, 129ª and 129ᵇ for the purpose of moving the segments forward when the end of the bar 127 is lifted so that the shoulder is out of engagement with the comb plate 128, during the time that the register wheels are out of mesh with the racks. This brings all of the rearwardly extending projections 131 of the tripped carrying segments against the vibrating bars 137, whereby the said carrying segments are held rearward in readiness to carry when said vibrating bars 137 are lowered. The bars 137 are mounted in rock arms 136 upon a rock shaft 135 on the end of which is a rock arm 139 (see Fig. 5) connected to a link 138, said link carrying a tappet which is operated by the cam 82 as described in my Belgium patent aforesaid.

*Multiplying devices.*—I have intentionally omitted the multiplying plates and their controlling multiplier keys from my present application as these would tend to confuse the illustrations of my present invention. The machine, however, is designed to receive these parts and it will therefore be understood that while they are not here illustrated and described that it is my intention to use the same when desired.

*Minuend register.*—For the purpose of distinction, I will designate the rear totalizer wheels 268 as the minuend register into which the minuend or larger number to be subtracted from is introduced. The items comprising the minuend register in the wheels 268 are set up on the key board, the "D" or "Dec." key depressed and the motor operated or the handle pulled as the case may be.

Where multiplying plates are used, the wheels 268 constitute the product register and product previously obtained in the multiplying operation may constitute the minuend.

In the ordinary operations of the machine, the "P" key is depressed and the motor key operated to print the product and introduce the same into one of the forward groups of totalizer wheels 119. Where a remainder is obtained in the operation of subtraction, the same "P" key is depressed and the motor operated to print the remainder and introduce the same into one of the forward totalizers.

*Subtrahend register.*—For the purpose of distinction I may designate the groups of totalizer wheels 119 as subtrahend registers into any one of which items may be introduced from the keys merely by depressing the keys in group A and operating the handle or motor key. The total as obtained in the subtrahend register may be set up in the pendants 235 through the racks by depressing the "T" and "E" keys and operating the motor; or, a number set up on the key board may be directly introduced into the pendants by depressing the "E" key and operating the motor.

In my present machine, it is immaterial whether the minuend is first registered in the minuend register by a series of items, or whether the subtrahend items are registered in the forward totalizer wheels and interspersed with the minuend items. Before subtraction can be carried on, however, the subtrahend, whether registered in the wheels 119 or set up on the key board, must be introduced into the pendants 235.

*Subtraction key.*—400 indicates the subtraction key (see Fig. 16) which is connected to the bell crank lever 401 and in turn connected to a rod 402, said rod being connected to a slide bar 403 having an upward extension 404 at its rear end which engages with a plate 276 pivotally mounted in the lower end of the rock arm 276ª mounted in a bracket extension 276ᵇ extending forwardly from one of the multiplier frame plates 237. The plate is the same with which the multiplier keys coöperate and in conjunction with the rock arm 276ª forms a toggle. The lower end of the plate 276 is pivotally connected to a plate 277 carried by a rock shaft 278 which rock shaft (see Fig. 12) is mounted in suitable bearings on the base plate of the machine. When the subtraction key is depressed, the toggle above mentioned is straightened so as as to rock the shaft 278 (see Fig. 17), the rocking of which shaft effects a shifting of the cams 82 and 109 in the following manner. On the left hand end the rock shaft 278 has a rock arm 279 (see Fig. 12) which extends under the horizontal member of the bell crank lever 180. The vertical member of this bell crank lever engages a reduced portion in the sleeve on which cams 82 and 109 are mounted (see Fig. 24). It will be recalled that cams 82 and 109 may occupy three positions as determined by the result keys. The normal position is as shown in Fig. 24, wherein the quadrant 186 is in line with the first notch of the post 188. In this position the tappet 112 is under control of the cam 109 and the bar 113 will thereby be depressed and engage the register wheels 119 with the racks after the racks have been moved forwardly. The cam 82 is also in control of the tappet 140 on the lower end of the bar 138 so that the vibrating bar 137, which restores the carrying segments 129, identified with the register wheels 119 would be operated at the commencement of the backward stroke of the machine by riding over the cam face 146 and the heel portion 147 of the cam 82. This cam 82 also carries a pin 83 which, in its normal or first position, coöperates with the tappet 84 mounted on the upper ends of a rock arm 85 arranged upon shaft 86 (see Fig. 3). A rock arm 87 on the shaft 86 is connected by a link 89 to the frame 58 in which is mounted the traveling carriage containing the stop pins 63 (see Fig. 19) whereby upon the initial forward movement of the cam 82, the said traveling carriage is lifted to position the pins 93 in the stationary field of stops. It will be noted that in this normal or first position, the cams 82 and 109, with the bar 272 which controls the engagement of the register wheels 268 with the rack and the bar 138ª which restores the carrying segments identified with the register wheels 268, are not operated. When the cams 82 and 109 are moved to their second position as when the "extension" or "total" keys are depressed, it will be observed that said cams are midway between the projections on the bars 138 and 138ª—113 and 272, so that none of said bars, and the parts controlled thereby, are operated by the cams in this second position.

When the cams are in their third position, the bar 138ª is under control of the cam 82 and the bar 272 is under control of the cam 109. Bars 138 and 113 are not operated in this third position of the cam. This third position of the cams is incidental to a registration of a number in the register wheels 268, and when the "D" or "Dec." key is depressed after a number has been set up on the key board, means are provided as disclosed in my Belgium patent causing the tappet 84 to follow or be moved in unison with the pin 83 so that when the rear register is used as a primary register the machine will operate normally and print or record items, but obviously the number set up on the key board, when registered in the rear totalizer will not be registered into any of the forward toalizer wheels 119 because the bars 138 and 113 are not operated when the cams are in their third position. When the subtraction key is operated, the cams are moved to their third position, but the tappet 84 is not caused to follow or move in unison with the cam 82 and its operating pin 83 and hence the traveling carriage is not raised. The stop pins 93 are thus left depressed so as to permit the racks to move with perfect freedom.

It has been described that when the subtraction key is depressed, the shaft 278 is rocked and through the arm 279, the bell crank 181 causes the cams 82 and 109 to be moved to their third position. It might also be mentioned that in this third position the arm 167$^a$ and its pin 167$^b$ which latter ordinarily operates in a slot in cam 82 are left in their normal position together with the tappet 84 so that when the cams occupy their third position, the pin 167$^b$ is out of the slot and consequently no printing can occur.

Turning now to Fig. 10, it will be observed that the arms 102 which have a slot and pin connection with the racks 100 and which are pulled forward by the springs 103 and restored by the bar 104 and carried by the arms 105, are pivotally mounted on a shaft 106; and on this shaft are supplemental bars 102$^a$ having notches in their upper ends to coöperate with pins 217 on the bars 102. The lower ends of the supplemental bars 102$^a$ are provided with rearwardly extending fingers 218 which extend between the plate 219 and its overhanging projections 219$^a$ mounted on a rock shaft 220, all as described in the Belgium patent aforesaid. These supplemental bars 102$^a$ are also capable of occupying three positions. The first or normal position is that wherein the bars rest upon the shaft 106 in which position the bars 102 may be vibrated without moving the supplemental bars 102$^a$. The second position of the supplemental bars 102$^a$ is that wherein they are slightly elevated, but not so far as to engage the pins 217 and in which second position the bars 102$^a$ to which the pendants 235 are connected, may be restored without moving the bars 102. The third position of the supplemental bars 102$^a$ is that incident to the depression of the extension key in which they are raised so that the notches in their upper ends will engage the pin 217 and the supplemental bar will be moved with the bars 102 and position the pendants either to represent a number set up on the key board, or to transfer a number in a group of totalizer wheels 119 back to the pendants. This is represented in Fig. 21.

The "T" or total key in my present application is similar to that disclosed in my Belgium patent, (see Fig. 19) wherein the rod 170 connected to said key is connected by a link 171 to a bell crank lever 172 whose forward extension 172$^a$ extends over a pin 183 on a rock arm 184 so as to depress the link 185, and raise the tappet 84 out of the path of the pin 83. The bell crank 172 is connected by a link 174 to a bell crank 173 having a forward extension 177 located over pin 178 on the lower end of bar 113, so that when the total key is depressed, the register wheels 119 are brought into engagement with the racks 100 to yield their total on the forward movement of said rack. There is an extension 179 lying under the horizontal member 180 of the cam shifting bell crank so as to move the same to their second or neutral position. The "extension" key in the present case is different from that disclosed in the Belgium patent in that when it is desired to transfer a number back into the pendants from the wheels 119, the "E" or extension key and the "T" or total key have to be simultaneously depressed before the machine is operated. In my Belgium patent aforesaid, this number could be transferred from the wheels 119 into the pendants by pressing the "E" key without the necessity of simultaneously depressing the "T" key.

In my present application, the "E" key is connected by a rod 325 to a bell crank 326, but this bell crank has no forward extension engaging the pin 183. The bell crank 326 is connected by a link 328 to bell crank 329, the bell crank 329 having no forward extension over the pin 178 on the bar 113. The bell crank 329 is however, provided with a rearward extension 331 coöperating with a pin 222 on a rock arm 221 on the shaft 220 to elevate the plate 219 and with it the supplemental bars 102$^a$ into engagement with the pins 217 on the bars 102. In this manner, it is possible to set up a number on the key board and by pressing the "E" key, transfer the same back into the pendants without having to first set up said number and introduce it into the wheels 119 and then transfer the number back into the pendants as is contemplated in the Belgium patent.

*Obtaining a remainder.*—As heretofore described, the manner of obtaining a remainder in my present machine is to add the complement of the subtrahend to the minuend and automatically add 1 in the units column.

The complement in the present instance is the difference between any digit and 9: for instance, the complement of 9 is zero, the complement of 8 is 1, etc.

Assuming, for purposes of the present description, that a series of items constituting the minuend have been introduced into the totalizer wheels 268 and that it is desired to set up the subtrahend in the pendants 235. If the subtrahend is in a group of wheels 119, the "T" and "E" keys are pressed and the motor operated; or, if it is desired to set up the subtrahend directly from the key board, the "E" key alone is depressed and the motor operated.

In the ordinary operations of the machine, a number set up on the key board will progressively move the traveling carriage toward the left, the initial movement of the main shaft raising said carriage and positioning the stop pins 93 to arrest the racks 100.

The depression of the "E" key, as shown in Fig. 21, will couple the bars 102$^a$ to the bars 102, and the pendants 235, under control of the links 231, pivotally connected to the upper ends of the bars 102$^a$, will be positioned on the track bars 236 extending from the stepped stop bars 239 having graduated stops at their upper ends for controlling the rack bars 100.

The pendants are positioned longitudinally along the track bars 236 and are located over the cross bars 247. These cross bars represent different digits as 1, 2, 3, 4, 5, 6, 7, 8, 9, and are located over the steps of the vertically movable subtraction plate 407. This plate is provided with a bell crank lever 408 whose lower end is pressed forward by means of a spring 409. The rear end of the bell crank lever rests upon the upper end of a lever 410 (see Fig. 4), the lower end of said lever having a pin engaging a slot in the rear end of the subtraction key bar 403. A spring 411 tends to hold the upper end of the lever 410 under the rearwardly extending member of the bell crank lever, and when the subtraction key is pressed, the lever 410 is rocked so that its upper end is moved rearwardly from under the bell crank lever 408 and the lower edge of said lever moves over a vibrating bar 262$^c$ (see Fig. 23). This bar is mounted in slots in the frame plates 237 and is connected by links 262$^a$ to rock arms 262$^b$ on the shaft 262, said shaft having a pinion 263 at one end which meshes with the segment 264, which segment is rocked at each operation of the machine. The bar 262$^c$ will thus make a vertical excursion at each operation of the machine and this excursion will be idle unless the subtraction key is operated, in which event, the subtraction plate will be connected to said bar so as to move vertically therewith and follow the excursion. The bar 262$^c$ is the same bar which operates the multiplying plates in my Belgium patent.

Assuming now that it is desired to obtain the remainder by subtracting 547 from 843, the example hereinbefore referred to, and that the minuend 843 is registered in the wheels 268, the number 547 is set up in the pendants 235 either directly from the key board or transferred from a group of totalizer wheels 119 as before described. The pendant in the units column will be located over the seventh cross bar 247 from the rear, the pendant in the tens column will be located over the fourth cross bar 247 from the rear and the pendant in the hundreds column will be located over the fifth cross bar 247 from the rear. The subtraction key is now pressed and as this key is connected so as to connect the motor with the driving shaft of the machine, the motor will immediately operate the machine raising the bar 262$^c$ on what might be termed the forward stroke and lifting the subtraction plate 407 therewith. This subtraction plate will raise all of the bars 247 according to the stepped upper head thereof and such of the pendants, as have been positioned above the bars, will likewise be raised and carry with them the stepped stop bars 243. Each of the racks 100 is provided with a lateral projection 242 at its rear end which normally lies in a plane above the upper edge of the stepped member 243, but when this member is raised its shoulders are brought in front of the projection 242 according to the position of the pendant. This positioning of the stepped stop bars 243 occurs at the commencement of the forward stroke and as the machine continues its forward stroke, the restoring bar 104 permits all the racks to move forward to their "9" position, or to such position as is determined by the positioned stepped stop bars 243.

As the pendant in the units column has been moved over the seventh cross bar (247) from the rear and as this cross bar is located over the step marked "2" of the subtraction plate, the stepped stop bar 243 controlled thereby will be positioned so that the units rack bar will be arrested when its projection 242 contacts with the shoulder marked "2" (Fig. 10). It will thus be seen that the rack 100 has advanced a distance of two teeth and will add 2 in the units register wheel, when the register wheels 268 are engaged therewith. The stepped stop bar controlling the rack in the tens column, being located over the five cross bar, will permit the tens rack bar to move forward a distance of five teeth, while the stepped stop bar, controlling the hundreds rack, will permit its bar, in the example under consideration, to move forward a distance of four teeth. The rest of the rack bars of higher denomination will be moved forward to their "9" position. Thus the bars will be positioned to register 999999452 in the wheels 268 and on what may be termed the back stroke of the machine. When the restoring bar 104 moves the racks rearwardly, registration will be effected and the complement of the subtrahend will be added to the minuend.

To obtain the remainder, it is only necessary to press the "P" key and the motor key when the remainder will be printed and the wheels 268 cleared.

If it is desired to introduce the remainder into a group of adding wheels 119 so that a number of remainders may be accumulated, as in obtaining a series of bank balances, this may be done: or the remainder may be recorded and the wheels 268 cleared without introducing said remainder into a group of wheels 119.

*Automatically adding one in the units column.*—In the example under consideration, it will have been observed that when the complement of the subtrahend 547 is added to the minuend, the following occurred:

000000843   (Minuend)
999999452   (Complement of subtrahend)
───────────
000000295

The first rule heretofore given applies and the 1 carried from the hundreds column to the thousands column will be added to the nines in the higher denominations and these "9's'" will be carried out of the machine so that the number actually represented in the register wheels 268 is 295. This is not the correct remainder because 547 subtracted from 843 leaves 296.

The means for introducing 1 into the units column is best seen in Figs. 9 and 6 wherein the subtraction plate is provided with a lateral projection 413 upon which rests the bent beveled end of a lever 414 pivotally mounted upon one of the frame plates 237 and connected by a link 415 to a lever 416. This lever 416 is pivoted to one of the cross bars of the carrying section and has a hooked end which extends under the latch bar 127 connected to the carrying segment identified with the units registering wheel 268. In this manner, when the subtraction plate is raised, the lever 414 will be vibrated and through the connections above described, raise the latch bar 127 so that the spring connected to the units carrying segment will pull said segment forwardly and rotate the units registering wheel 268 a distance of one tooth at the commencement of the forward excursion of the racks and before the registering wheels 268 are moved into engagement with the racks. Thus 1 is automatically introduced into the units column of the minuend register before the subtrahend is introduced thereinto and in the example under consideration we have:

000000843   (Minuend)
000000001   (Automatically added)
999999452   (Complement of the subtrahend)
───────────
000000296

Ordinarily the units wheel 268 does not coöperate with the carrying segment 129 because there is no wheel of lower order to operate said carrying segment, and hence in adding operations such a segment would be superfluous. In subtracting operations, however, I provide the units wheel with a carrying segment and trip the latch bar which holds the same retracted by means of the lever 416, as above described, and this carrying segment will be restored by the vibrating bar 137 the same as the other carrying segment.

*Obtaining the difference between a larger number introduced into the subtrahend register and a smaller number introduced into the minuend register.*—Mathematically, it is of course impossible to subtract a larger number from a smaller, but mechanically it is possible, where a larger number is introduced into the so-called subtrahend register, to obtain the difference between such a number and a smaller number introduced into the so-called minuend register. In my machine, this is accomplished as follows: Recalling to mind the second rule, above set forth, that when the complement of a larger number (introduced into the subtrahend register) is added to a smaller number (introduced into the minuend register) the total of the digit of the highest order in the minuend register, when added to the complement of the number in the subtrahend register in the same order, will never exceed 9 and that this fact is taken advantage of to maintain the machine in such position so that when the operator is notified of the fact that an effort is being made to subtract a larger number from a smaller by complementary addition, it is only necessary for the operator to again press the subtraction key to obtain the true difference between the two numbers.

Referring to Fig. 16, it will be noted that the edge of the lower plate 276 of the toggle, which is pivotally connected at its upper end to the rock arm 276ª and at its lower end to the rock plate 277 fixed on the rock shaft 278, coöperates with a cam faced extension 418 carried by the plate 219. This plate 219 is fixed on the rock shaft 220 and engages the fingers of the supplemental bars 102ª. Shaft 220 is slidingly mounted in its bearings and is normally held inwardly by means of a spring 419. When, however, the subtraction key is depressed, shaft 220 and its carried parts are moved outwardly against the spring 419 and held in such outward position until the subtraction key is released when the shaft is restored to normal position, providing that the operation of subtraction, where the subtrahend is smaller than the minuend, has been properly performed. If, however, the subtrahend is larger than the minuend, the shaft 220 is held in its outer position by the following means:

Referring to Fig. 7, which is a diagrammatic illustration of carrying sectors for the registering wheels 268, it will be observed that there are two toothless sectors 129$^a$ and 129$^b$ to the left of the carrying segment 129 of the registering wheel 268 of highest order. Conjoined to the register wheel 268 of highest order is, what might be termed, a one-toothed wheel 420, which one-toothed wheel moves in unison with the wheel 268 of highest order. The single tooth 421 of this one-toothed wheel coöperates with the carrying pawl 121$^a$ which is of slightly different shape from the carrying pawls 121. These latter pawls 121 serve as zero stops so that when the wheels 268 are reversely rotated, as when yielding a total, the wide tooth 120, when it strikes against the under side of the segment 121, will be arrested so as to determine the zero position of the wheel, as shown in Fig. 7$^a$. The pawl 121$^a$ instead of being beveled on its under side so as to serve as a stop for the cam tooth 421, is formed with a squared shoulder whereby, in the reverse rotation of the single toothed wheel 420, its tooth 421 will pass the pawl 121$^a$ and the pawl 121 will be operated. The tooth 421 is circumferentially located a little to one side of the carrying tooth 120 so that when said carrying tooth 120 stands at zero, the tooth 421 is in line with its coöperating pawl 121$^a$ holding said pawl forward or in a tripped position, as shown in Fig. 7$^c$. This is the normal position of the parts which is also shown in Fig. 6, and the result is that the pin 126$^a$ on the pendant lever 124$^a$ will keep the latch bar 127$^a$ normally raised so that the toothless segment 129$^b$ will be pulled forwardly by its spring 132$^a$. This segment 129$^b$ is provided with a pin 129$^c$ which fits in a slot of a T-shaped lever 422 pivoted to one of the frame plates of the machine, the lower member of which lever is connected by a link 423 to a portion of the printing mechanism so as to disable said printing mechanism and prevent a record being made at all times when the segment 129$^b$ is in a rear or abnormal position, as will hereinafter be more fully described.

The lever 422 is connected by a link 424 through a slot and pin connection to a rock arm 425 (see Fig. 4$^a$) mounted on the shaft 220. This link 424 has a pivoted member 424$^a$ connected thereto and held in a forward position by means of a spring 424$^b$. The lower end of this pivoted member is stepped or provided with a shoulder so as to coöperate with a pin 425$^a$ on the rock arm 425. Whenever the toothless segment 129$^b$ is in its normal or forward position, the link 424 is raised so that the rock arm 425 is permitted to rise to its highest position. When, however, the tooth 421 is out of engagement with its coöperating pendant 121$^a$, as shown in Fig. 7$^b$, the segment 129$^b$ stands in an abnormal or rearward position in which the link is depressed.

In the operation of subtracting a smaller number from a larger, it will be remembered, according to Rule 1, that when the complement of the subtrahend is added to the minuend, the "9's" in the registering wheels of higher order are carried out of the machine and all of said registering wheels stand at zero. The registering wheel 268 of highest order standing at zero, places the tooth 421 behind the pendant pawl 121$^a$ and consequently the segment 129$^b$ is permitted to move forward. When, however, it is attempted to subtract a larger number from a smaller, the complement of the number registered in the subtrahend register when added to the number registered in the minuend register will not be carried through the wheels of higher order, but will leave a series of "9's" so that when it is attempted to record the remainder by pressing the "P" key, the wheel 268 of highest order standing at "9", not zero, will locate the tooth 421 above the pendant 121$^a$ as shown in Fig. 7$^b$. In the preceding operation of the machine, following the depression of the subtraction key wherein cam 455 was moved to its third position so as to depress the rock arm 425, said rock arm remaining depressed, will hold the link 424 in its lowered position because the wheel 268 of highest order stands at 9, not zero, and the segment 129$^a$ has not been operated to release the latch bar 127$^a$. The pivoted member 424$^a$ was, in the previous operation of the machine following the depression of the subtraction key, placed in position to engage the pin 425$^a$ on the rock arm 425 to hold said rock arm depressed, after said arm was forced downwardly by the cam 455. Hence the bar 424 will be held depressed until the wheel 268 is returned to zero position so as to release the latch bar 127$^a$. The depressed position of the rock arm 425 causes a projection 425$^c$ (see Figs. 4 and 12) to engage a lug 278$^a$ on shaft 278 whereby the shaft 220, and its carried parts, are held in their outer position. Shaft 220 carries an arm 221 heretofore referred to, and on this arm is an extension 429 which, when the shaft is in its outer position, is located over the bell crank extension 310 operated by the "P" key. This extension 310 is cut away under the horizontal member 180 of the bell crank lever and, in ordinary operations, when the "P" key is depressed, the totalizer wheels 268 are drawn into mesh with the racks 100 so that they will yield their total when the machine is operated on the forward movement of the racks, and said total, remainder, or product, will be introduced into one of the groups of wheels 119, the wheels 268 standing clear at the end of such transfer. It may not be desired to add the sum in the minuend register and the complement of the larger number registered in the subtrahend register in the group of wheels 119, for to do so would subtract the difference between the smaller number in the minuend register and the larger number in the subtrahend register from the total in the wheels 119, as hereinafter described, and I therefore provide the member 180 of the bell crank lever with a sliding block 430 (see Fig. 13) which is engaged by the extension 429 to move over the rear extension of the bell crank lever 310 so as to enable said lever 310 to operate the bell crank lever 180—181 and move the cams 82—109 to their second or neutral position.

Recalling for the moment that when it is attempted to subtract a larger number from a smaller, that the subtrahend is set up in the pendants 235 and the subtraction key pressed, the machine will be operated by the motor without manipulating the motor key and that when it is attempted to obtain the remainder by pressing the "P" key, the machine can not yield a correct remainder, and the shaft 220 and its associate parts, under these circumstances, is left outwardly displaced, I provide means of indicating to the operator such abnormal condition, and this means, as disclosed in the drawings, is an audible signal which, when sounded, signifies that to obtain the correct difference between the two numbers it is necessary for the operator to again press the subtraction key and finally the "P" key or "product" key and the motor key.

*Sounding of the alarm.*—Referring to Figs. 2, 3, and 4, 431 indicates a bell mounted on the frame plate 237. 432 is a hammer mounted upon the end of a sliding plate 433, said plate being guided by a slot and pin connection on the frame plate 237. The rocking frame 105 carries a pin or screw 434 which is designed to operate in a shouldered slot 435 in the forward end of the bar 433, the shoulder of said slot being located in the upper edge thereof. The link 424 carries a pin 436 which extends under the bar 433 when said link is raised, and consequently the forward end of the bar 433 is normally held elevated. When, however, link 424 stands depressed, pin 436 is withdrawn from the forward end of the bar 433 and when the machine is operated, and the restoring frame 105 is rocked forward, its screw or projection 434 will catch the shoulder of slot 435 and retract the bar 433 against the tension of its spring 437. When the bar is thus held retracted or in a forward position, the cam 438 mounted on the shaft 81 will, on the forward stroke of the machine, engage under the forward end of the bar 433, raising the shoulder in the slot of the same above the screw 434, permitting the bar to move rearwardly under the impulse of its spring so that the bell hammer carried thereby will strike the bell. The bell is sounded when the "P" key is depressed and it is attempted to obtain a remainder when the parts are in the abnormal position just described.

*Operating the subtraction key to obtain the correct difference between a larger number registered in the subtrahend register and a smaller number registered in the minuend register.*—When the alarm is sounded, it is only necessary for the operator to press the subtraction key again to obtain the correct difference between the larger number registered in the subtrahend register and the smaller number registered in the minuend register. When the parts connected to shaft 220 are held outwardly in their displaced position by the link 424, the rock arm 429 is under control of the "P" key and consequently when the "P" key is depressed and the motor operated, the supplementary levers 102$^a$ will be connected to the levers 102 and the incorrect remainder set up in the pendants.

The depression of the "P" key, when the shaft 220 is held outwardly, is the same in effect as if the "P" and "E" keys were operated and results in transferring the number from the wheels 268 back into the pendants leaving said wheels 268 clear at the end of the operation. This I prefer to accomplish by means of a single key, rather than depend upon the operator to depress the two keys as is done, for instance, in transferring a number from any group of wheels 119 back to the pendants, in which operation the "T" and "E" keys are simultaneously depressed and the machine operated.

Referring to the example under consideration, where it is attempted to subtract 843 from 547, the complement of the subtrahend added to the minuend will register in the wheels 268, 999999704, and this number, when the product key is pressed and the machine operated, will be indicated by the position of the pendants 235.

When the subtraction key is depressed through the means hereinafter described, the complement of 999999704 will be introduced into the register wheels 268 and (these wheels, now standing at zero) this complement will be the true difference between 547 and 843, or 296.

Briefly stated, when the number registered in the subtrahend register is larger than the number registered in the minuend register, the depression of the subtraction key automatically adds 1 in the units wheel and adds the complement of the number in the subtrahend register to the number registered in the minuend in the register wheels 268; but as the "9's" are not carried out the machine, the tooth 420 does not coöperate with its pendant pawl 121$^a$ and consequently the parts controlled by the segment 129$^b$, to wit: the link 424, and connected parts, are left in an abnormal position. Among these is the shaft 220 and its carried parts so that said shaft, by means of its rock arm 429 will, when the "P" key is depressed to obtain the remainder, rock the shaft 220 and, instead of printing the incorrect remainder, will set up said incorrect remainder in the pendants 235 and restore the wheels 268 to their normal or zero position. Thus when the subtraction key is again pressed, the machine will be operated, 1 added in the units column, and the complement of the incorrect remainder registered in the wheels 268. The "P" key may now be pressed and the machine operated to obtain the correct difference between the two numbers.

*Restoring the pendants 235.*—The cam 314 on the shaft 106 (see Fig. 4) carries a restoring bar 315 which coöperates with an extension 316 at the lower rear edge of the supplemental bars 102$^a$. When the cam is rocked rearwardly, the restoring bar 315, when the subtraction key is pressed and the machine is completing its stroke, engages the extensions 316 and restores all of the pendants to zero position, holding them in such position until the "P" key is pressed to obtain the remainder.

Referring now to Fig. 3, it will be noted that there is a cam plate 439 mounted on the shaft 81 and rigidly connected to the cam 438. The cam 314 has a headed pin 314$^a$ (see Fig. 3$^a$) which extends inwardly toward the cam plate 439, said headed pin normally lying to one side of the rear end of the cam 439, as shown in Fig. 3. The cam 314 with its hub portion is slidingly mounted on the shaft 106 and is normally held in its outer position by means of a spring connected to arm 317, as shown in Fig. 24.

The lever 426, heretofore described, which coöperates with a rock arm 425 on the shaft 220, is provided with an upward bell crank extension 426$^a$ (see Fig. 15) which engages the hub of the cam 314 and when the subtraction key is operated, two movements result which affect the cam 314.

First, the shaft 220 is moved outwardly and carries with it the arm 425, placing the pin 425$^a$ on the end of said arm in the path of the cam face on the lower edge of a cam 455 loosely mounted on the hub which connected the cams 82—109 and which loosely mounted cam 455 is movable longitudinally the shaft 81 together with said cams 82—109. The upper end of this floating cam 455 is provided with two prongs 456 which coöperate with a pin 457 on the cam 82 (see Fig. 4). The depression of the subtraction key moves the cams 82—109 to their third position, that is, inwardly with respect to the machine, and carries with them the floating cam 455 so as to place the same in proper alinement with the pin on the rock arm 425 which latter is moved outwardly slightly.

Secondly, as the shaft 81 rocks on the forward stroke of the machine, the initial movement will be idle with respect to the floating cam 455 which cam will not be actuated until the pin 457 strikes the forward prong 456, when the lower edge of cam 455 will be moved rearwardly. This rearward movement depresses the rock arm 425 and as the lever 426 is under this arm, the bell crank extension 426$^a$, in engagement with the hub of cam 314, will move the cam 314 inwardly so as to place its headed pin 314$^a$ in the path of the cam 439, which cam is fixed to the shaft 81 and has no longitudinal movement relative to said shaft. By the time the cam 314 is moved longitudinally its shaft, the cam plate 439 has been rocked forwardly so that on the rear stroke of the machine, as the cam 439 rocks back, its rear edge will engage the shank of the pin 314$^a$ and rock the cam 314, thus restoring all of the supplemental bars. On account of the head on the pin 314$^a$, the restoring bar 315 is held rearwardly and the cam 314 held inwardly temporarily. This inward position of the cam 314 causes the bell crank 426$^a$—426 to be rocked so that the projection 427 will hold the rock arm 428 elevated and through the shaft 220 and plate 219, the supplemental bars will also be held elevated in their second position. All of the pendants are of course in their zero position. When the "P" key is depressed and the machine operated, the forward movement of the cam 439 releases the cam 314 permitting it and its restoring bar to move forwardly and outwardly so that the parts are restored to normal position. The supplemental bars, being permitted to drop, their connected teeth 232, again engage between the teeth of the fixed segmental plates 233.

*Disabling the printing mechanism.*—As the operation of subtraction involves the introduction of complements into the register wheels 268, it is not desired that such digits be printed; nor is it desired when the number registered in the subtrahend is larger than the number registered in the minuend register, to print the incorrect remainder. The link 423 which is connected to the T-shaped lever 422 has a slot and pin connecting with a rock arm 460 (see Fig. 6) which rock arm is connected to a rock shaft 461 carrying arms 462 in which is arranged a bar 463. This bar is designed to coöperate with notches in the ends of bell crank levers 153 which coöperate with the primary releasing pawls 152 of the printing mechanism in the manner described in my Belgium patent. When the link 423 is in the position shown in Fig. 6, the rock arms 460—462 hold the bar 463 out of the notches in the bell cranks 153, but when the T-shaped lever 422 is rocked as when the link 424 is depressed, the link 423 is moved forward so that the rear wall of its slot engages the screw connecting said link to the arm 460 and depresses the bar 463, and consequently the printing mechanism can not be operated. Thus, whenever the bar 424 is depressed, the printing mechanism is disabled, and whenever said bar is raised, the printing mechanism is operative except as controlled by the pin 167$^b$, heretofore referred to.

*Releasing the bar 424.*—When the bar 424 is depressed, the swinging plate 424$^a$ at its lower end lies over the pin 425$^a$ and this occurs at every operation of the subtraction key. The subtraction key, as heretofore described, shifts the cams 82—109 and 455 to the third position, and as the cam 455 operates the rock arm 425, it will draw down the bar 424, so as to prevent the operation of the printing mechanism and also rock the segment 129$^b$ rearwardly so that its latch bar 127$^a$ can engage the comb plate 128. The segment 129$^b$ will be held retracted by its latch bar 127$^a$ until said bar is tripped by the pendant pawl 121$^a$ operated by the single tooth 421. If the subtrahend is smaller than the minuend, this tripping occurs just before the end of the rearward stroke of the machine, and when the latch bar 127$^a$ is raised in the manner above described, the segment 129$^b$ will move forwardly raising the bar 424, but leaving the plate 424$^a$ thereof in engagement with the pin 425$^a$. When the "P" key is operated to obtain the remainder, the cams 82—109 and 455 are shifted to their second position, in which second position a plate 455$^a$ on cam 455, is so located that in its path of movement, it will engage the plate 424$^a$ and swing the same rearwardly so as to place the shoulder of said plate behind the pin 425$^a$.

The plate 455$^a$ as shown in Fig. 24, is provided with a cutaway portion near or next to the cam 455, so that when the cam 455 is in its third position, said cutaway portion will be in line with the plate 424$^a$ and consequently when the cam is rocked, following the depression of the subtraction key, the plate 424$^a$ will not be operated. When the number introduced in the subtrahend register is larger than the number introduced in the minuend register and the subtraction key is depressed to add the complement of the number in the subtrahend register to the number in the minuend register, the 9's are not carried out of register wheels 268 and consequently the latch bar 127$^a$ engages the comb plate 128 because the pendant pawl 121$^a$ is not tripped, the single tooth 421 being in its "9" position just above the pendant pawl, as shown in Fig. 7$^a$. The plate 424$^a$ is thus left over the pin 425$^a$, so as to hold the rock arm 425 depressed and the shaft 220 in its outward position. When the "P" key is depressed, and the machine operated, it will set up the number registered in the wheels 268 (the sum of the complement of the larger number in the subtrahend register, the number in the minuend register, and the "1" automatically added in the units column) in the pendants by virtue of the arm 429 lying over the bell crank extension 310 as before described. When the machine is operated after depressing the "P" key, the plate 424$^a$ is disengaged from the pin 425$^a$ as the cam 455 is moved to its second position by the "P" key, so that its extension 455$^a$ will rock the plate 424$^a$. When the incorrect remainder (that is, the sum of the number in the minuend register, the complement of the larger number in the subtrahend register, and the "1" automatically added in the units column may be designated) is transferred from the wheels 268 to the pendants 235, all of the register wheels 268 are returned to zero, the tooth 421 is in engagement with the pendant pawl 121$^a$, and hence the segment 129$^b$ stands forward, the latch bar 127$^a$ being unlatched from the comb plate. Thus, when the subtraction key is again depressed, it will permit the plate 424$^a$ to swing over the pin 425$^a$ and upon the subsequent depression of the "P" key in the operation of the machine, the plate 424$^a$ will again be swung rearwardly.

*Preventing the improper tripping of the segment 129$^b$.*—When the latch bar 127$^a$ holds the segment 129$^b$ retracted, which occurs when an incorrect remainder is registered in the wheels 268, it is necessary to prevent the bar 127$^a$ from being unlatched, which would permit the bar 424 to rise and the shaft 220 and associate parts to be restored to normal position. The shaft 220 when in its outer position, is rocked so as to hold the supplemental bars 102$^a$ in engagement with the pins 217, so that when the "P" key is depressed, the incorrect remainder will be set up in the pendants 235. When the supplemental bars 102$^a$ are thus elevated, the pins 232 are above the teeth of the fixed segments 233. If the latch bar 127$^a$ was raised under these conditions and segment 129$^b$ permitted to move forward, all of the supplemental bars 102$^a$ would drop when the "P" key was depressed, and upon the initial operation of the machine, engage the pins 232 and fixed segments 233. Thus, in the subsequent operation of the machine, the incorrect remainder would not be set up in the pendants 235. To prevent this improper operation, I cut away the lower end of the pendant finger 124ª, see Figs. 7 and 7ᶜ, so that when the register wheels 268 are in mesh with the racks 100, the operation of the pendant pawl 121ª will not operate the pendant finger 124ª. However, when the register wheels 268 are raised out of engagement with the racks 100, the pendants 121 and 121ª moving with them, the pendant 121ª will be elevated to a position so that when it is elevated, it will operate the pendant lever 124ª and unlatch the bar 127ª, permitting the segment 129ᵇ to move forwardly as shown in Fig. 6.

*The range of the machine.*—There are nine rack bars shown in the accompanying drawings and the range or capacity of the machine is 999,999,999. This capacity is entirely available in adding operations, but in subtraction, I prefer to block the traveling carriage 57, so that its range will not exceed 7 or 8 orders, thus leaving one or two extra rack bars, which are necessary to properly perform subtracting operations, such as herein contemplated.

It is of course obvious that the capacity of the machine could be increased by retaining the nine rack bars which are under control of the keyboard, and adding an extra rack bar which may be typeless, if desired, to coöperate with the register wheel 268 of higher order. If an extra rack bar were not provided and all of the rack bars were under control of the keyboard, or if in the additive operations in the wheels 268, a number was carried into the wheel of highest order which is conjoined to the one toothed wheel, said one toothed wheel would not properly coöperate with the segment 129ᵇ, and in consequence, if it was attempted to subtract a larger number in the subtrahend register from a smaller number in the minuend register, the incorrect remainder would be set up in the pendants and no way provided to get it out except by introducing a number which would cause the one toothed wheel to occupy the zero position. I therefore propose to block the travel of the pin carriage, which may readily be done by introducing a block 57ª on the lifting track in which said carriage operates, as shown in Fig. 24. This will prevent the carriage from moving leftwardly the full capacity of the machine, and consequently there will remain one or two rack bars which are beyond the control of the keyboard, and which in ordinary operations, especially if two rack bars are reserved as high carrying bars, will not disturb the proper operative relation between the highest register wheel 268, its conjoined one toothed wheel and the segment 129ᵇ controlled thereby. It will of course be understood in this connection that all of the rack bars in subtraction operations are under control of the subtraction plate, but it is preferred to reserve one of said rack bars at the left and place them beyond the control of the keyboard.

*Disabling the printing mechanism when the paper carriage is raised.*—The rock arm 460 which controls the latch bar 463 has a companion arm 460ª loosely mounted on the opposite end of the rock shaft carrying said arm and which is connected by a spring 460ᵇ to the rock arm 462ª (see Fig. 25). There is a bell crank lever 460ᶜ mounted on a bracket secured to the top frame plate of the typewriting mechanism (see Fig. 1) which, when the paper carriage is lowered and in proper position for its platen to receive a printing impression, will engage the arm 460ª and rock the same rearwardly, so that the bar 463 is yieldingly held out of the notches in the ends of the bell crank levers 153.

If, during the operation of the machine, when the paper carriage is lowered in printing position, it is desired to disable the printing mechanism, the spring 460ᵇ will yield and permit the bar 463 to enter the notches in said bell crank lever. When the paper carriage is raised, the bar 463 is drawn by a spring 460ᵈ down into the notches in the bell crank levers, and the printing mechanism is thus automatically disabled and the type hammers are prevented from striking the type, even though the machine is operated. I have found, that when the type are struck by the type hammers in the absence of a platen to make a printing impression, the delicate springs which hold the type depressed are liable to be broken.

*Engaging the register wheels with the racks.*—In my Belgium patent, the bar 113 is directly connected to one of the frames 49 in which the register wheels 119 are mounted. I have found, from practical experience, that the parts would work loose and sometimes when it was attempted to engage the wheels 119 with the racks, the frame 49 would twist and some of the wheels 119 would either not be operated, or not fully engage their racks.

In my present construction, I connect the upper end of the bar 113 with a rock arm 500 fixed to a rock shaft 501, on which shaft are also fixed rock arms 502 on each side of the carrying sections. To these rock arms are mounted cam faced bars 503 which operate between pins 504 fixed in the frame plate, and the cross bar 505 arranged between the forward ends of the frames 49. In this manner when the bar 113 is depressed, the bars 503 are pushed forwardly under the pins 504, their cam faces engaging the cross bar 505 and depressing the frames 49 and their carried wheels 119 equally, and on each side of the rack bars. Even if the frame 49 and its parts are loosened in use, the wheels 119 are forced to equally engage all of the rack bars. The rear register wheels 268 are likewise pressed into engagement with the racks by pressure exerted on each end of the shaft 122 on which are mounted the pendants 121, by means of cam faces on the lower ends of the rock arms 506 fixed upon a shaft 507 to the rock arm 508 to which the bar 272 is connected.

*Accumulating remainders.*—As shown in Fig. 13, when the shaft 220 is in its outer position, the extension 429 moves the blocking plate 430 over the extension 310 so that when the "P" key is depressed, the cams 82—109 will be moved to their second position in which neither set of register wheels 119 or 268 are under control of said cams. This occurs in the operation of subtracting a larger number registered in the wheels 119 from a smaller number registered in the wheels 268. When the shaft 220 is released to move inwardly, the blocking projection 430 occupies a position to one side of the extension 310 and consequently when the "P" key is depressed, and the shaft 220 is in its inner position, the register wheels 268 will be brought in mesh with the racks to yield the total, remainder, or product, whatever may be the character of the number registered therein, but the cams 82—109 are not shifted, they remaining in their first position. In this position they are in control of the totalizer wheels 119 so that as the machine is beginning its rearward stroke, the "P" key is released and permitted to rise, the register wheels 268, now standing at zero, also being disengaged from the racks 100, the wheels 119 are brought into mesh with the racks, so that on the rearward movement of said racks the number formerly indicated by the wheels 268 will be introduced into the wheels 119.

Where the subtrahend is smaller than the minuend, it is desirable to accumulate the remainders in one of the groups of wheels 119, as in accumulating bank balances of different customers; but, where the number registered in the subtrahend register is larger than the number registered in the minuend register, as in the case of an overdraft, it is not desired to accumulate the over-draft with the balances; therefore, means are provided in the form of an "overdraft" or "O.D." key which, when depressed, will shift the cams 82—109 to their second position, whereby the wheels 119 are not brought into mesh with the racks 100 and simultaneously the ribbon is shifted so as to print such "over-draft" in a distinguishing color. If desired, a new group of wheels 119 could be placed under control of the racks so as to accumulate such "over-drafts" separately from the balances; but in some instances, it is desired to print the "over-drafts" in a distinguishing color and not accumulate them in any one of the forward totalizers.

*The over-draft key.*—Referring now to Fig. 22, 510 indicates the "over-draft" or "O.D." key which is connected by the bell crank 511 and a rod 512 to the bell crank 513 having a forward extension lying above the pin on the lower end of the rod 185 which controls the tappet 84 and whose displacement prevents the pin carriage from being lifted; a link 514 connects the bell crank 513 to another bell crank 515 having a forward extension lying over a pin on the lower end of the rod 272, whereby when the "O.D." key is depressed, the totalizer wheels 268 will be brought into mesh with the racks. This latter bell crank also has a rearward extension lying under the member 180 of the bell crank lever which shifts the cams 82—109 so that when said bell crank is operated, the cams will be shifted to their second position. The rod 516 is connected to the bell crank 511 and to a lever 517 whose upper end coöperates with the pin 518 on the lower end of the ribbon shifting lever 519. The upper end of this lever 519 connects with the shifting frame 520 carrying the spools on which is wound bi-colored ribbon 521. Thus, when the "O.D." key is depressed, the ribbon is automatically shifted to print the over-draft in a distinguishing color which over-draft is not accumulated in the machine.

*Error key control of the subtracting mechanism.*—If the subtracting key is depressed in my present machine, it will operate the clutch so that the motor will immediately start or drive the machine and there is no control over such operation after the depression of the subtracting key. Hence, if the subtracting key was depressed through mistake, such mistake would be irremediable. In some instances, however, it is not desired to operate the motor clutch by the subtraction key and in handle operated machines, it may be desired to correct an erroneous depression of the subtraction key before the handle was pulled or the motor key pressed. The error key shown in the accompanying drawings is substantially the same in its control over the traveling carriage and other parts as described in my Belgium patent and a detailed description need not therefore be given here. If the subtraction key is operated by mistake and the machine is a handle operated machine, or requires the depression of the motor key to throw the clutch, and it is desired to correct an error, I provide a pin 522 (see Fig. 18) at the rear end of the error key, which pin coöperates with the bell crank lever 523 lying under a vertically movable bar 524 (see Fig. 10)

which bar will lift the rearward extension of the bell crank latch plate mounted on the shank of the subtraction plate and permit the lever 410 to move there-under, which movement restores the subtraction key to its normal or elevated position.

*Subtracting an overdraft from accumulated balances.*—In some banks, it is desired that the machine be operated in such a way that all overdrafts be deducted from the grand total of balances in order that they may obtain the net daily balance without going through the operation of accumulating the overdrafts in a separate set of accumulator wheels 119 and then subtracting such overdafts from the grand total of the balance. To do this with the present machine, it is only necessary to remove the blocking plate 430 so that the bell crank lever 180—181 will leave the cams 82—109 in their first position when the "P" key is pressed to transfer the sum of the complement of the larger number in the subtrahend register and smaller number in the minuend register back into the pendants. The removal of the blocking plate 430 will permit the "P" key to be depressed without moving the cams 82—109 into a neutral position and consequently the wheels 119 will be thrown into engagement with the racks as the machine completes its forward stroke and the so-called incorrect remainder will be added into a set of accumulator wheels 119 in which the grand total of balances have been accumulated.

If we consider that the customer's balance and accumulated deposits amount to $547.00 and that the aggregate of checks drawn against this account amount to $843.00, (the difference between these two numbers being $296.00) using the example heretofore referred to for convenience of reference, we know, from what has been said before, that 999999704 will be registered into the group of wheels 119. It makes no difference whether this operation of subtracting the overdraft from the grand total of balances occurs at the beginning or at the end of a day's work. It is to be supposed that the grand total of balances will exceed the overdraft and if we assume that this overdraft was obtained at the commencement of a day's work and that the wheels 119 stood at 999999704, the accumulation of subsequent balances in said wheels will give a net balance.

For instance: If the net balance obtained was $2,560.00 and this was added in the wheels 119, said wheels would stand

```
999999704   (Complement of overdrafts)
000002560
─────────
000002264
``` that is, $2,264.00 is the net balance after deducting $296.00 from $2,560.00, or

```
$2,560.00   Balance
   296.00   Overdraft
─────────
$2,264.00   Net balance
```

It will be seen from the above that the wheels 119 will contain the true difference between the total of balances and an overdraft before the subtraction key is operated the second time to obtain the complement of the incorrect remainder and register the true difference between the two numbers in the wheels 268. Of course the overdraft key may be operated to print the overdraft in red and not add it into the group of wheels 119 as heretofore described. It makes no difference whether in commencing a day's work a series of complements of overdrafts are accumulated in the wheels 119, because any number of these complements, containing 9's in the higher orders, will always cause the wheels 119 of higher order to stand at 9.

For instance:

```
999 999 704   (Complement of   $296.00   overdraft)
999 999 352         "       "     648.00       "
999 999 152         "       "     848.00       "
999 990 431         "       "    9569.00       "
─────────────                   ─────────
999 988 639         "       "  $11,361.00       "
    60 000   Accumulated balances
─────────
    48,639   Net balance
```

What I claim is:

1. In a calculating machine, means for representing a number corresponding to a minuend, devices for representing a number corresponding to a subtrahend, means for moving the first mentioned means under control of the subtrahend representing devices to positions whereby the correct difference may be subsequently obtained where the number represented in the minuend mechanism is smaller than the number represented by the subtrahend devices.

2. In a calculating machine, the combination of means for representing a number corresponding to a minuend, devices for representing a number corresponding to a subtrahend, means for placing one of said number representing mechanisms in control of the other whereby the complement of the subtrahend is added to the minuend and "1" simultaneously added in the units column thereof, and means whereby when the number in the subtrahend representing devices is larger than the number in the minuend representing means, the complement of the total of the numbers formerly obtained may be secured and "1" simultaneously added to the units column to thereby obtain the true difference between the two numbers originally set up in the minuend and subtrahend representing devices.

3. In a calculating machine, the combination of means for representing a number corresponding to a minuend, devices for representing a number corresponding to a subtrahend, means for moving the first mentioned means under control of the subtrahend representing devices whereby said subtrahend devices are cleared or returned to zero and the complement of the number formerly contained therein is added to the number in the minuend representing means, and means whereby when the number in the subtrahend representing devices is larger than the number in the minuend representing means, the total of the number in the minuend representing means and the complement of the number formerly standing the subtrahend representing devices is transferred from the minuend representing means to the subtrahend representing devices and a complement of such transferred number subsequently obtained and registered in the minuend representing means to indicate the difference between the two numbers originally standing in the minuend representing means and subtrahend representing devices, and means for adding "1" in the minuend representing means at the taking and transferring of such complemental numbers.

4. In a calculating machine, the combination of register wheels for registering a number corresponding to a minuend, devices for representing a number corresponding to a subtrahend, racks which control and are controlled by said minuend register wheels and subtrahend representing devices, printing type positioned by said racks, means for making a record from the positioned type, means whereby the subtrahend representing devices are placed in control of said register wheels to thereby add the complement of the number represented by said subtrahend register wheels to the number represented in the minuend representing register wheels, the subtrahend representing devices standing clear at the end of such operation, means for setting up the total represented in said register wheels in the subtrahend representing devices thereby clearing said register wheels and again obtaining the complement of the number represented by said subtrahend representing devices and registering the same in said register wheels, and means for preventing the operation of said printing type during the time that the complements are being transferred into the register wheels.

5. In a calculating machine, means for representing a number corresponding to a minuend, devices for representing a number corresponding to a subtrahend, means for moving the first mentioned means under control of the subtrahend representing devices whereby the correct difference may be obtained where the number represented in the minuend mechanism is smaller than the number represented by the subtrahend devices, printing mechanism operable to record numbers represented in the minuend and subtrahend representing mechanisms together with the remainders obtained, and means for rendering said printing mechanism inoperative when the complement of the subtrahend is being transferred to the minuend representing means.

6. In a calculating machine, the combination of means for representing a number corresponding to a minuend, means for representing a number corresponding to a subtrahend, means for mechanically determining the complement of the number in the subtrahend representing means and adding the same to the number in the minuend representing means, said means coincidentally with said addition introducing "1" into the units column of the minuend representing means, and means whereby when an incorrect remainder is obtained where the number in the minuend representing devices is smaller than the number in the subtrahend devices, the complement of said incorrect remainder, plus "1" in the units column, may be obtained and thereby the true difference between the two numbers secured.

7. The combination of means for representing a number corresponding to a minuend, means for representing a number corresponding to a subtrahend, devices for placing the subtrahend representing means in control of the minuend representing means whereby a remainder may be secured, said devices, however, where the number in the minuend representing means is smaller than the number in the subtrahend representing means, remaining in an abnormal position so that upon the next succeeding operation the true difference between the two numbers may be secured.

8. In a calculating machine, the combination of means for representing a number corresponding to a minuend, means for representing a number corresponding to a subtrahend, a key and its connections whereby "1" is introduced into the units column of the minuend representing means whenever said key is operated, means for placing the subtrahend representing devices in control of the minuend representing devices, said means being controlled by said key whereby a correct remainder may be obtained and said subtrahend representing means returned to zero, said key controlled connections, however, remaining in an abnormal position in the event that the number in the minuend representing means is smaller than the number in the subtrahend representing devices whereby upon a succeeding operation of said key the correct difference between the two numbers will be represented in the minuend representing means.

9. In a calculating machine, the combination of means for representing a number corresponding to a minuend, devices for representing a number corresponding to a subtrahend, means for placing the subtrahend representing devices in control of the minuend representing devices whereby the complement of the subtrahend is added to the minuend and "1" simultaneously introduced in the units column thereof thereby securing a correct remainder, a set of register wheels into which remainders may be transferred and accumulated, means whereby when the number in the subtrahend representing devices is smaller than the number in the minuend representing devices, the total of the complement of the subtrahend and minuend, plus "1" in the units column thereof, is transferred back to the subtrahend representing devices and the minuend representing means cleared, thereby enabling a complement of such total transferred to be registered in the minuend representing devices and "1" simultaneously added in the units column thereof whereby the true difference between the numbers originally standing in the minuend representing means and subtrahend representing devices is obtained, and another set of register wheels into which such last mentioned complement so obtained may be registered separately from the accumulated remainders.

10. In a calculating machine, the combination of means representing a number corresponding to a minuend, devices for representing a number corresponding to a subtrahend, means for mechanically obtaining the complement of the subtrahend and adding it to the minuend representing devices, a register in which the remainders are accumulated, and means for preventing the introduction of a number into said register where the number originally represented in the subtrahend devices was larger than the number represented by the minuend devices.

11. In a calculating machine, the combination of means for representing a number corresponding to a minuend, means for representing a number corresponding to a subtrahend, key-controlled mechanism whereby the complement of the number represented in the subtrahend devices may be obtained and added to the number in the minuend devices, said minuend representing devices being held in an abnormal position when the number represented by the subtrahend devices is larger than the number standing in the minuend representing devices.

12. The combination of means for representing a number corresponding to a minuend, means representing a number corresponding to a subtrahend, key-controlled mechanism, which, when operated, will automatically add "1" to the units column of the minuend representing devices and place the subtrahend representing devices in control of the minuend representing devices, whereby, the complement of the subtrahend will be added to the minuend, said minuend representing means in the event of an incorrect remainder being secured, being left in an abnormal position, whereby, upon a succeeding operation of said subtrahend representing devices the correct remainder will be represented in said minuend devices.

13. In a calculating machine, the combination of means representing a number corresponding to a minuend, means for representing a number corresponding to a subtrahend, a key and its connections whereby the subtrahend representing devices are placed in control of the minuend representing devices and the complement of the subtrahend added to the minuend, and means operated by said key and its connections for adding "1" into the units column of the minuend representing mechanism whenever said key is operated, another key and its connections for clearing the minuend representing devices where the number in the subtrahend representing devices is larger than that in the minuend devices, whereby, when the first mentioned key is operated, the complement of an incorrect remainder will be secured and represented in the minuend representing devices thereby determining the correct difference between the two numbers originally standing in the minuend and subtrahend devices.

14. In a calculating machine, the combination of a series of wheels representing a number corresponding to a minuend, the wheel of highest order only in said series being provided with a projection which normally stands at zero, and parts which are abnormally displaced when said projection is in other than zero position.

15. In a calculating machine, the combination of a series of wheels representing a number corresponding to a minuend, devices for representing a number corresponding to a subtrahend, means for placing the subtrahend representing devices in control of the minuend representing means whereby the complement of the subtrahend is added to the number in the minuend wheels and "1" simultaneously added in the units column thereof, the minuend wheel of highest order having a projection which normally stands at zero when a correct remainder is obtained where the subtrahend is smaller than the minuend, said projection, however, standing in other than zero position where the number in the subtrahend representing devices is larger than the number in the minuend wheels.

16. In a calculating machine, the combination of a series of adding wheels, the wheel of highest order being provided with a projection which normally stands at zero, actuating devices coöperating with said wheels, printing type which are positioned by said actuating devices, and means coöperating with the projection on said wheel of highest order whereby printing is prevented from said type when said projection is in other than zero position.

17. In a calculating machine, the combination of means for representing a number corresponding to a minuend, devices for representing a number corresponding to a subtrahend, means for placing the subtrahend representing devices in control of the minuend representing means whereby the complement of the subtrahend is added to the minuend and "1" simultaneously introduced into the units column thereof, and means for notifying the operator of an incorrect remainder when the number in the subtrahend representing devices is larger than the number in the minuend representing means.

18. In a calculating machine, the combination of means for representing a number corresponding to a minuend, devices for representing a number corresponding to a subtrahend, means for placing the subtrahend representing devices in control of the minuend register and simultaneously adding "1" in the units column thereof for obtaining a correct remainder, and means whereby when the number in the subtrahend representing devices is larger than the number in the minuend representing means, the total of the number originally standing in the minuend representing means, plus the complement of the subtrahend and "1" added in the units column thereof may be transferred back into the subtrahend representing devices, thereby clearing the minuend representing means, and introducing the complement of such transferred number into the minuend representing means and simultaneously adding "1" into the units column thereof, thereby obtaining the correct difference between the two numbers originally standing in the minuend representing means and subtrahend representing devices, printing mechanism, and a key and its connections whereby when the last mentioned complement is obtained, it will be printed or recorded in a distinctive color.

19. In a calculating machine, the combination of means representing a number corresponding to a minuend, devices representing a number corresponding to a subtrahend, a key and its connections for placing the subtrahend representing devices in control of the minuend representing means, and means for restoring said key and its connections to normal positions when the same is improperly operated.

20. In a calculating machine, the combination of actuators, a register, a printing mechanism whose type are positioned by said actuators, a platen for supporting a sheet of paper to be printed upon, said platen being movable into and out of operative relation to the printing type, means under control of the platen whereby when said platen is not in operative relation to the printing type the said printing mechanism is prevented from operating, and means operated by the movement of parts of the machine for rendering said printing mechanism inoperative when said platen is in operative relation to the printing type.

21. In a calculating machine, the combination of a set of register wheels for accumulating numbers corresponding to remainders, means for mechanically determining such remainders or difference between two numbers, and means under control of said difference - determining mechanism whereby in certain operations the difference between two numbers is deducted from said accumulated remainders.

22. In a machine of the character described, the combination of a set of wheels for accumulating remainders, such as bank balances, a register for accumulating numbers, such as deposits, setting-up devices for representing other numbers, such as paid checks, and means whereby said setting-up devices are placed in control of said register to obtain the difference between the total of the deposits and the total of the paid checks, means whereby such difference in the nature of balances are accumulated in said accumulator wheels, and means, when the difference between the total of deposits and the total of paid checks in any given account is in the nature of an overdraft, for causing the accumulating wheels to be operated to represent the accumulated balances less the overdraft.

In testimony whereof I hereunto affix my signature in the presence of two witnesses, this 25th day of March, 1912.

HUBERT HOPKINS.

Witnesses:
M. P. SMITH,
LILY ROST.

Copies of this patent may be obtained for five cents each, by addressing the "Commissioner of Patents, Washington, D. C."